INVENTOR
B. C. HAYS
BY
S E Hollander
ATTORNEY

July 15, 1969     B. C. HAYS     3,456,240
METHOD AND ARRANGEMENT FOR SIGNALING IN A REMOTE CONTROL SYSTEM
Filed Nov. 30, 1965     10 Sheets-Sheet 10

United States Patent Office 3,456,240
Patented July 15, 1969

3,456,240
METHOD AND ARRANGEMENT FOR SIGNALING IN A REMOTE CONTROL SYSTEM
Bruce C. Hays, Omaha, Nebr., assignor to American Telephone and Telegraph Company, New York, N.Y., a corporation of New York
Filed Nov. 30, 1965, Ser. No. 510,600
Int. Cl. H04q; H04l 15/00
U.S. Cl. 340—163                                 15 Claims

ABSTRACT OF THE DISCLOSURE

A system is disclosed having a master station for controlling apparatus at remote stations. A selected command signal, generated at the master station, is transmitted to a remote station and registered thereat. To verify that the proper signal has been registered, a plurality of signals including the selected signal are sent from the master station. The remote station returns these signals which originated at the master station back to the master station after modifying the signals according to the signal priorly registered at the remote station.

---

This invention relates to remote control systems and particularly to signaling methods and arrangements for such systems.

In a particular aspect this invention relates to methods and arrangements whereby a master station can transmit command signals to any one of a plurality of remote stations and verify that the command signals have been received at the remote station.

In a more particular aspect this invention relates to remote control systems and methods and arrangements for verifying the receipt at a remote station of command signals transmitted from a master station by transmitting additional signals from the master station.

Remote control systems generally comprise at least one master station and a plurality of remote stations each of which is located at a point where control functions are to be performed. Such systems are widely used in the management of pipe line and communication networks where the control of many unattended remote stations can be accomplished more economically from an attended master station. For example, in certain communication networks intelligence is often transmitted between two distant points over a communication channel made up of a plurality of serially connected links. These links might comprise wire facilities, radio links or carrier systems and the like, and each link may include repeaters or amplifying equipment to compensate for the transmission losses introduced by the transmission media.

While the compensating equipment can be tested and adjusted manually at each location or even arranged so that it is to a limited degree self-adjusting, it is often desirable to perform certain tests and adjustments at the remote stations from the centralized master control station.

Also, certain of the communication links might be provided with spare stand-by facilities that can be switched into service in the event that one of the regular facilities fails. By controlling the switching of spare facilities into service from a master control station the overall channel outage can be kept to a minimum.

In addition to making compensating adjustments, performing tests and switching spare channel facilities into service, it is sometimes desirable to have the remote stations report to the master station any service irregularities, such as alarm conditions, that might occur at the remote stations. In this manner, the attendant at the master station is apprised of the conditions existing at each of the remote stations and can act accordingly to maintain the system in operation.

Thus, where many control functions are to be performed at remote stations, the master control station must first address the particular remote station at which the function is to be performed and then transmit selected command signals to the remote station to indicate which specific function is to be performed thereat. To assure that the correct remote station has been addressed and has received the proper command signals before the control function is executed, the remote station acknowledges the signals received from the master station with an appropriate answer-back signal. While various signaling arrangements had been used in the past for verifying the receipt of information at a remote station, these arrangements lack certain features which I have incorporated in the present invention.

Many prior art arrangements, for example, provide for the verification of the control intelligence transmitted to a remote station by having the remote station retransmit back to the master station the same information that the remote station received. More specifically, a selection of the control function to be performed at the remote station is made at the master station, and a command signal such as a coded pulse train is transmitted to the remote station and registered thereat. At the remote station a pulse generator is actuated to retransmit a similar pulse train to the master station in accordance with the information registered at the remote station. The master station then checks the information received from the remote station pulse generator with the command signal that was sent to the remote station, and if they match, the remote station is signaled to execute the control.

While these arrangements are suitable for their intended purpose, it is obvious that such arrangements require costly signal generating equipment at each of the remote stations for transmitting the answer-back code.

It is therefore one object of my invention to simplify remote control signaling arrangements by eliminating elaborate answer-back signal generating equipment at each of the remote stations.

Other arrangements for verifying the receipt of control signals at the remote station employ a plurality of coded signals wherein the remote station is programmed to respond to a fixed number of signals. For instance, a remote station might function upon the receipt of command signals consisting of pulse groups of ten pulses each wherein the different pulse groups comprise different combinations of positive and negative pulses. Thus, the remote station will only respond when it has received a complete pulse train of ten pulses.

These arrangements, of course, require complicated codes which are limited by the different combinations that can be obtained from a fixed size pulse train. In addition, there is no verification of which command signal was registered at the remote station but only a check at the remote station that a complete pulse group was received. Furthermore, extraneous signals introduced into this system may be mistaken for pulses of a legitimate command causing the remote station to act prematurely or erroneously.

Another object of my invention is to improve remote control signaling arrangements by verifying what information is registered at the remote station by transmitting additional signals from the master station.

In accordance with one exemplary embodiment of my invention the remote stations of a remote control system are equipped to answer-back upon the receipt of command signals from a master station by reflecting back to the master station verification signals which originate at the master station. Illustratively, let it be assumed that a remote control system comprises a master station and a plurality of remote stations at which control functions are to be performed and what pulse type signaling is to be used to transmit command signals between the stations. Let it also be assumed that a particular control function which is represented by the digit 3 (three pulses) is to be performed at one of the remote stations whose address code is represented by the digit 2 (two pulses). To initiate this control function at remote station 2, the attendant at the master station causes the digits 2 and 3 to be transmitted over the network to all of the remote stations. This can be accomplished in any one of many ways such as by operating appropriate selection keys on a console at the master station. The master station then outpulses the address code 2 followed by the command code 3. Station 2 responds to the address code 2 and registers the command signal represented by the digit 3.

The master station then automatically outpulses a series of verification digits 0 (ten pulses) which are reflected back by the remote station to the master station in accordance with the digits priorly registered at the remote station. More specifically, each of the ten pulses which represent the digit 0 is sent out and reflected or echoed back to the master station, but since the digit 2 was registered at the addressed remote station, only the first two pulses from the master station are reflected back thereto. Similarly, when the ten pulses representing the second verification digit 0 are sent out, only the first three pulses are reflected back indicating that the command digit 3 had been registered at the addressed remote station.

At the master station the reflected signals are registered and compared with the selection made by the attendant, and if they match, an execute signal is transmitted to the remote station causing the command to be executed.

In other words, at the master station certain signals (pulse groups of two pulses, three pulses, etc.) are selected from a plurality of signals (ten pulses) and transmitted to the remote station where they are registered. To verify what signals have been registered at the remote station the master station then transmits all of the signals (ten pulses) to the remote station and only those signals corresponding to the registered signals are echoed back to the master station. At the master station the transmitted signals are matched with the echoed signals, and if a proper match is detected, an execute signal is transmitted to the remote station.

While the invention has been briefly described with reference to signaling using pulse groups to represent different command codes it will be obvious from the ensuing description that other signaling arrangements can be used without departing from the spirit and scope of my invention. For example, multifrequency type signaling might be used wherein each command code could be represented by a tone burst of two frequencies out of a group of five possible frequencies. The two frequencies representing a command signal would be transmitted to the remote station and registered thereat. In addition, the command signal frequencies could control filter circuits at the remote station so that upon the subsequent transmittal of all five frequencies only those frequencies registered at the remote station would be reflected back to the master station.

In addition to responding to command signals from the master station any remote station can, in response to certain irregular conditions at the remote station, cause the master station to initiate a roll call of all remote stations to determine at which station the adverse condition exists. Having determined which remote station initiated the roll call, the master station can cause the individual remote station to report on the various conditions that may exist at that remote station.

One feature of my invention resides in a remote control system having signal generating equipment located at the master station for providing answer-back signals from the remote station.

Another feature of my invention is found in a remote control system including means at the remote station for reflecting back to the master station signals originating at the master station.

A further feature of my invention resides in a remote control system having means at a remote station for altering signals from the master station in accordance with signals priorly registered at the remote station and reflecting the altered signals back to the master station.

These and other objects and features of the invention will become readily apparent from the ensuing description with respect to the drawing in which:

FIGS. 3–11 shows a more detailed representation of the same remote control system including the invention.

Before describing in detail the overall operation of the system contemplated, a brief and general description will first be given with respect to the block diagram in FIG. 1.

GENERAL DESCRIPTION

Figure 1:
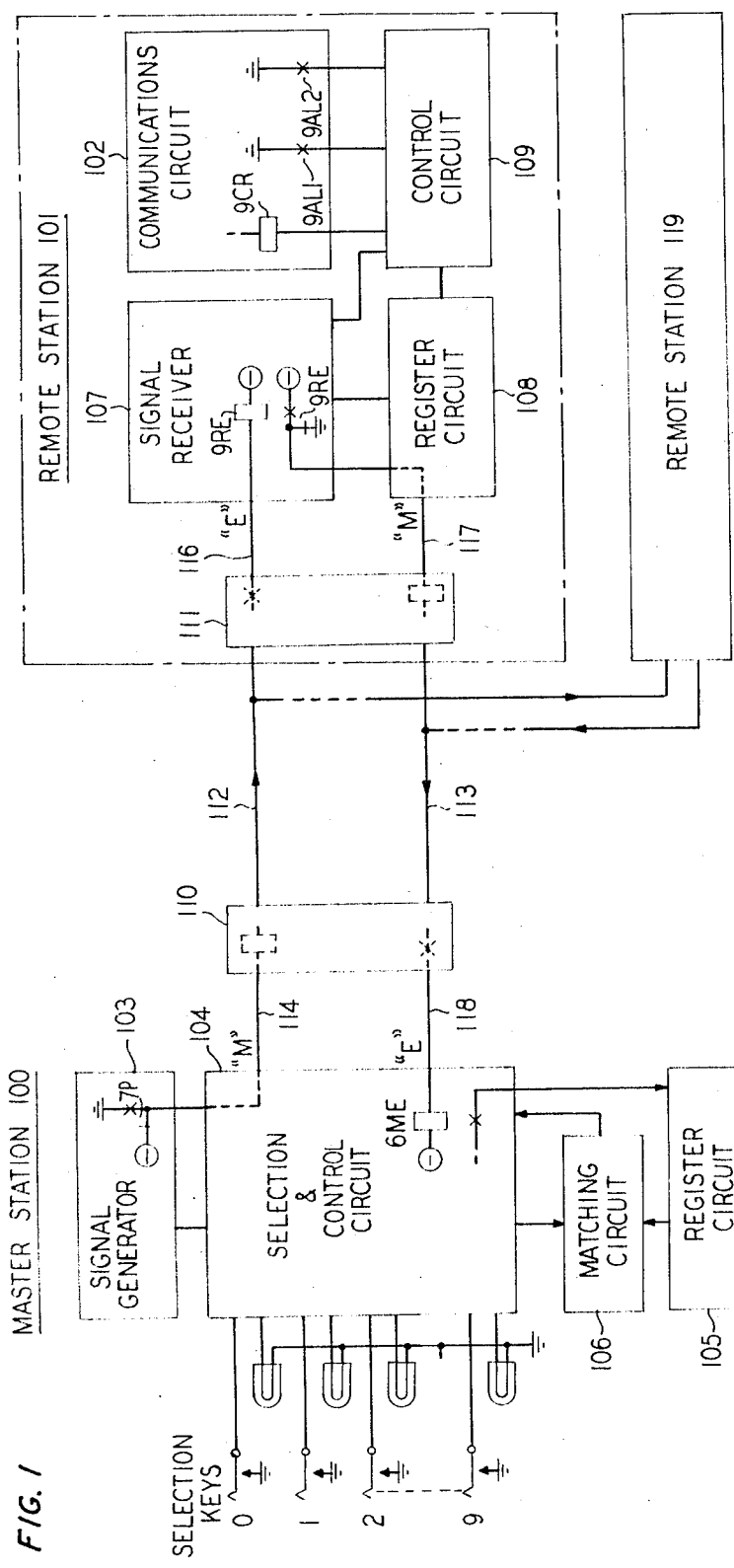
FIG. 1 shows a block diagram of the invention in a remote control system having a master station and a remote station.

Turning now to FIG. 1, there is shown a block diagram of one illustrative embodiment of the invention in a remote control system comprising a master station 100 and remote stations 101 and 119. Of course, in actual practice a system such as the one shown might include additional master stations and might have many more unattended remote stations each located in the proximity of the equipment which is to be controlled sucn as the communications ciriuit 102 in FIG. 1.

The master station 100 symbolically comprises a signal generator 103, a selection and rontrol circuit 104, register circuit 105 and matching circuit 106. In addition, the master station includes an attendant console equipped with various selection keys and lamps for aiding in the operation of the system. Each of the remote stations, on the other hand, comprises a signal receiver 107, a register circuit 108 and a control circuit 109.

Interconnecting the master station and the remote stations are suitable signaling means such as the single frequency signaling system shown in FIG. 1. The signaling system depicted in the block diagram comprises single frequency signaling circuits 110 and 111 coupled over suitable transmission media such as signaling channels 112 and 113. Single frequency signaling systems such as the one shown in FIG. 1 are well known in the art of telephone switching, and an example of one such system is described in an article by A. Weaver and N. A. Newell beginning on p. 1309 of vol. 33 of the Bell System Technical Journal, 1954.

Briefly, when the signaling system is normal, tone is transmitted over the interconnecting channel to control relays at the receiving end. Signaling is accomplished by removing and reapplying the tone under control of relays at the transmitting end which in turn release and reoperate relays at the distant end. Independent operation cna be obtained in each direction with one channel frequency using separate lines for signaling in each direction or by using a single line and transmitting a different channel frequency for the signaling in each direction. As symbolically illustrated in FIG. 1 of the drawing, when contacts 7P in signal generator 103 are operated, thus connecting a ground potential to M conductor 114, tone is being transmitted from single frequency signaling circuit 110 over channel 112 to signaling circuit 111 and relay 9RE is released. In a similar manner, when the contacts of relay 9RE in signal receiver 107 are normal, connecting ground to M lead 117, relay 6ME in selection and control circuit 104 is released. Application of the proper negative potential to the M leads 114 and 117 will cause the tone to be removed from the channels in the appropriate direction, and relays 9RE and 6ME, respectively, operate. Thus, pulses and supervisory signals can be transmitted between the master station 100 and remote station 101.

Each of the remote stations is assigned an address code, and the remote stations respond to various functions in the corresponding communications circuit such as circuit 102 at remote station 101.

To illustrate the operation of the system let it be assumed that the attendant at master station 100 desires to perform a control function represented by the command code 3 at remote station 101 whose address code is represented by the digit 2. To accomplish this, the attendant actuates selection keys 2 and 3 at the attendant's console. Operation of selection key 2 starts signal generator 103 which, in cooperation with selection and control circuit 104, causing two pulses to be transmitted over M lead 114 to the single frequency signaling system. By the interruption in the tone being transmitted to the remote stations, the receive relay 9RE at each remote station operates, following each of the two pulses of the digit 2.

In response to the address code 2 remote station 101 prepares itself for the registration of the command signal to be transmitted while the other remote stations, which are actuated by different address codes, are locked out. Operation of the selection key 3 (not shown, but see FIG. 3) by the attendant causes a pulse train of three pulses to be transmitted to remote station 101 and registered in register circuit 108. The code 23 which was selected to be transmitted is also registered in a portion of matching circuit 106 at the master station for subsequently matching the selected code with the answer-back from the remote station.

Having transmitted the digits 23 to the remote station, the master station now automatically transmits a series of verification digits 0, each comprising a pulse train of ten pulses, to the remote station. With each pulse transmitted over M lead 114 at the master station the E lead 116 at the remote station is closed to operate receive relay 9RE. Relay 9RE, in operating, in turn applies pulses through register circuit 108 to M lead 117 at the remote station, and each pulse on the M lead 117 causes receive relay 6ME at the master station to operate. In other words, the pulses generated at the master station are transmitted to the remote and reflected back to the master station.

It will be noted, however, that the reflected pulses are controlled by register circuit 108 which has stored therein the code 23 as a result of the prior transmission of the address and command codes. Therefore, only the first two pulses of the digit 0 transmitted by the master station will be reflected back to the master station indicating that the remote station 101 had been properly addressed by the digit 2. Transmission of the next verification pulse train causes the remote station to respond in a similar manner except that only the first three pulses of the ten pulses transmitted from the master station will be returned to the master station thereby indicating that the command code 3 had been registered at the remote station.

At the master station, the reflected digits are stored in register circuit 105, and if the reflected code matches the selected code, matching circuit 106 operates causing an execute signal to be transmitted to the remote station. Upon receipt of the execute signal at remote station 101, control circuit 109 is actuated to perform certain functions in communications circuit 102, and these functions are symbolically represented herein by the operation of relay 9CR.

In addition to the addressing of a particular station and causing selected devices to be operated thereat, the system being described herein includes features for reporting certain service irregularities which may occur at any of the remote stations. For example, communications circuits 102 might be equipped with several alarms which are actuated when different components of that communication circuit encounter trouble. These alarms have been illustrated by contacts of alarm relays 9AL1 and 9AL2. If an alarm should occur in communication circuit 102, one of the alarm relays would be operated to signal control circuit 109. Control circuit 109 causes a signal to be transmitted to master station 100 requesting that a roll call be taken of all remote stations. Master station 100 then interrogates each remote station to ascertain if any alarm conditions exist at the station being interrogated.

When the master station encounters a remote station having an alarm condition, the address code of the remote station is displayed on the appropriate lamps at the attendant's console. Having ascertained which remote station is experiencing an alarm condition, the attendant can address the remote station requesting that the remote station report back informing the master station as to the precise alarm conditions that exist at that particular remote station.

DETAILED DESCRIPTION

Having briefly described the operation of the arrangement with respect to the block diagram in FIG. 1, a more detailed description of one illustrative embodiment of my invention will now be given with respect to FIGS. 3–11 of the drawing.

Arrangement of equipment

Figure 2:
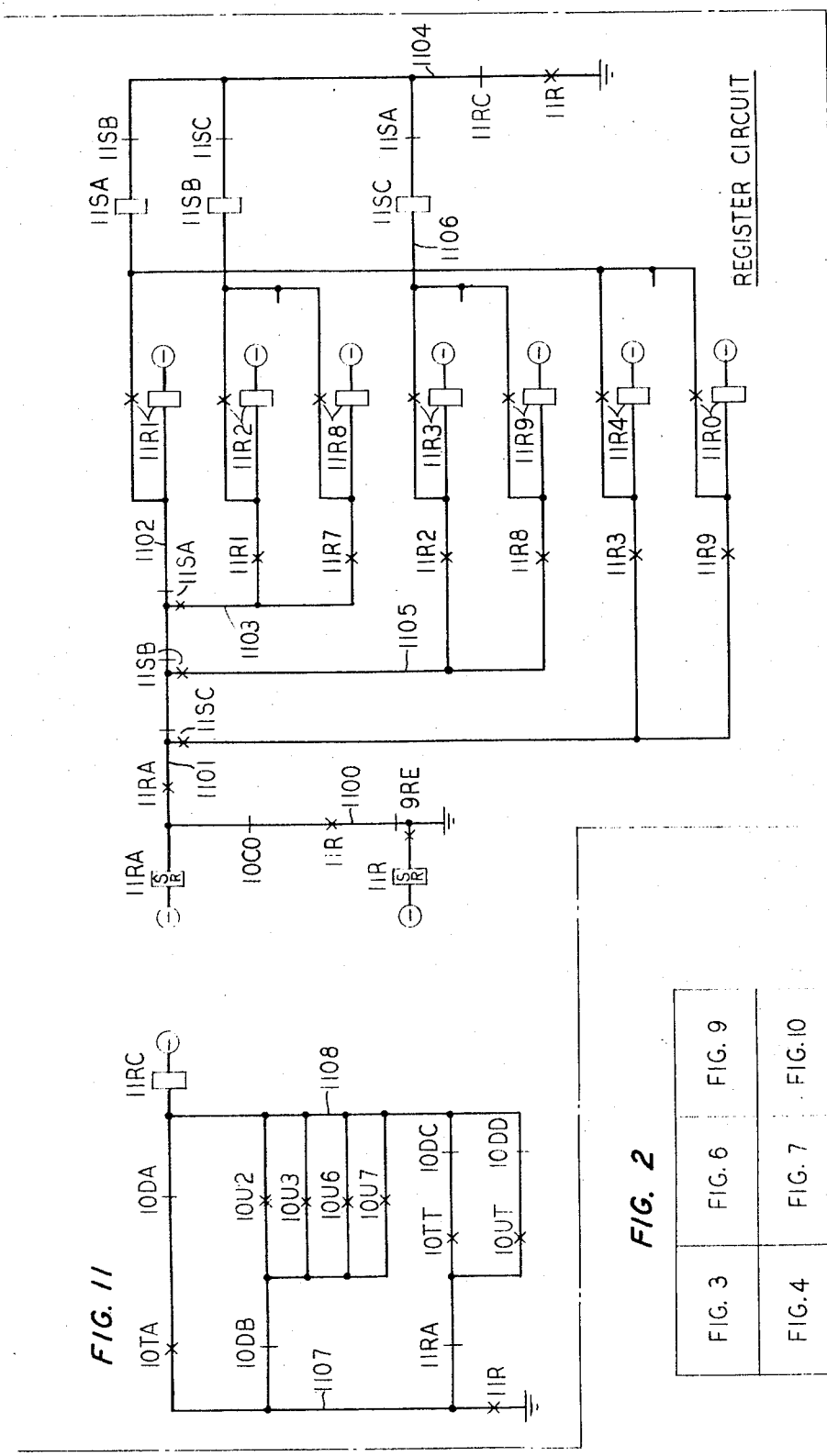
FIG. 2 shows the arrangements of FIGS. 3–11.
Figure 3:
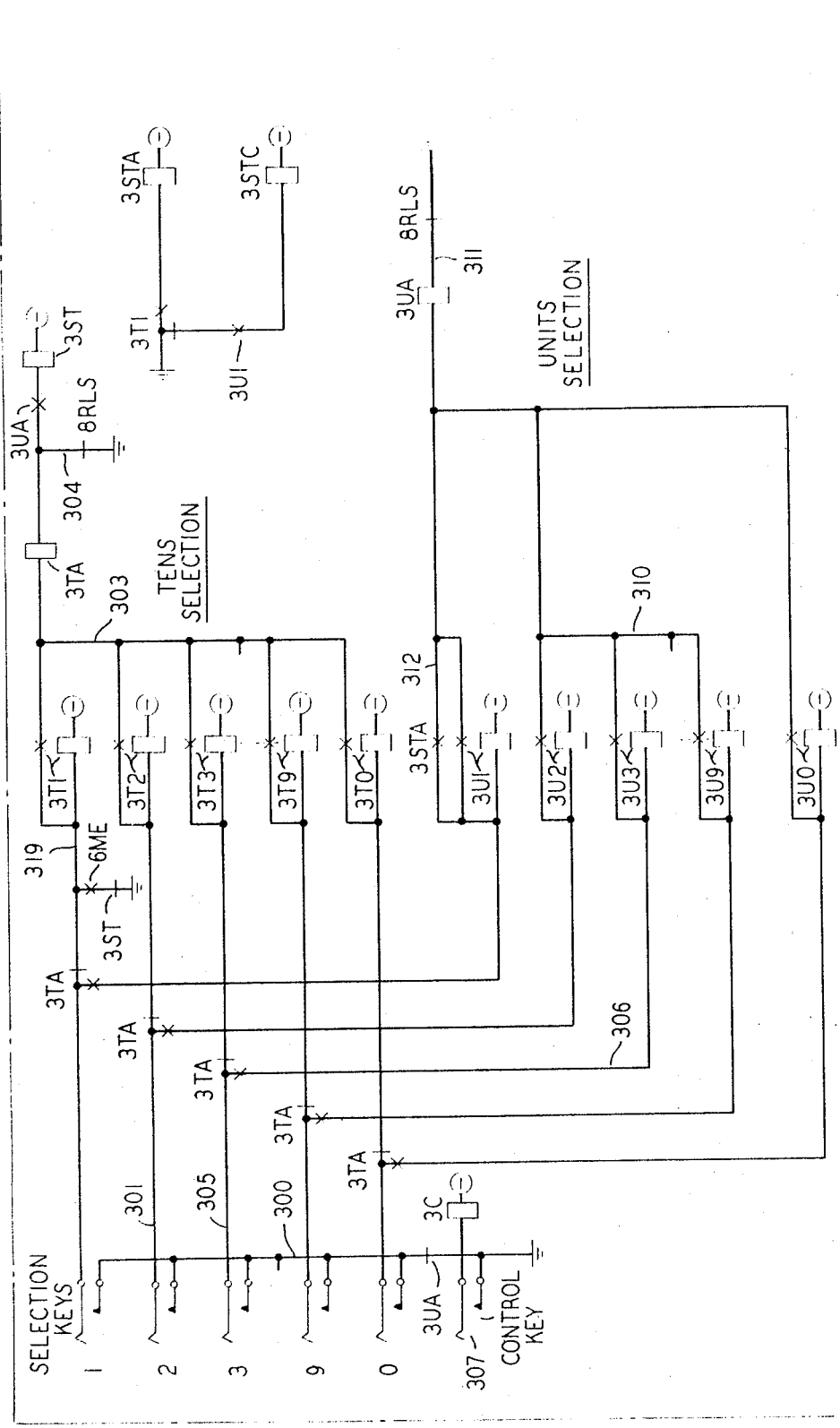
Figure 4:
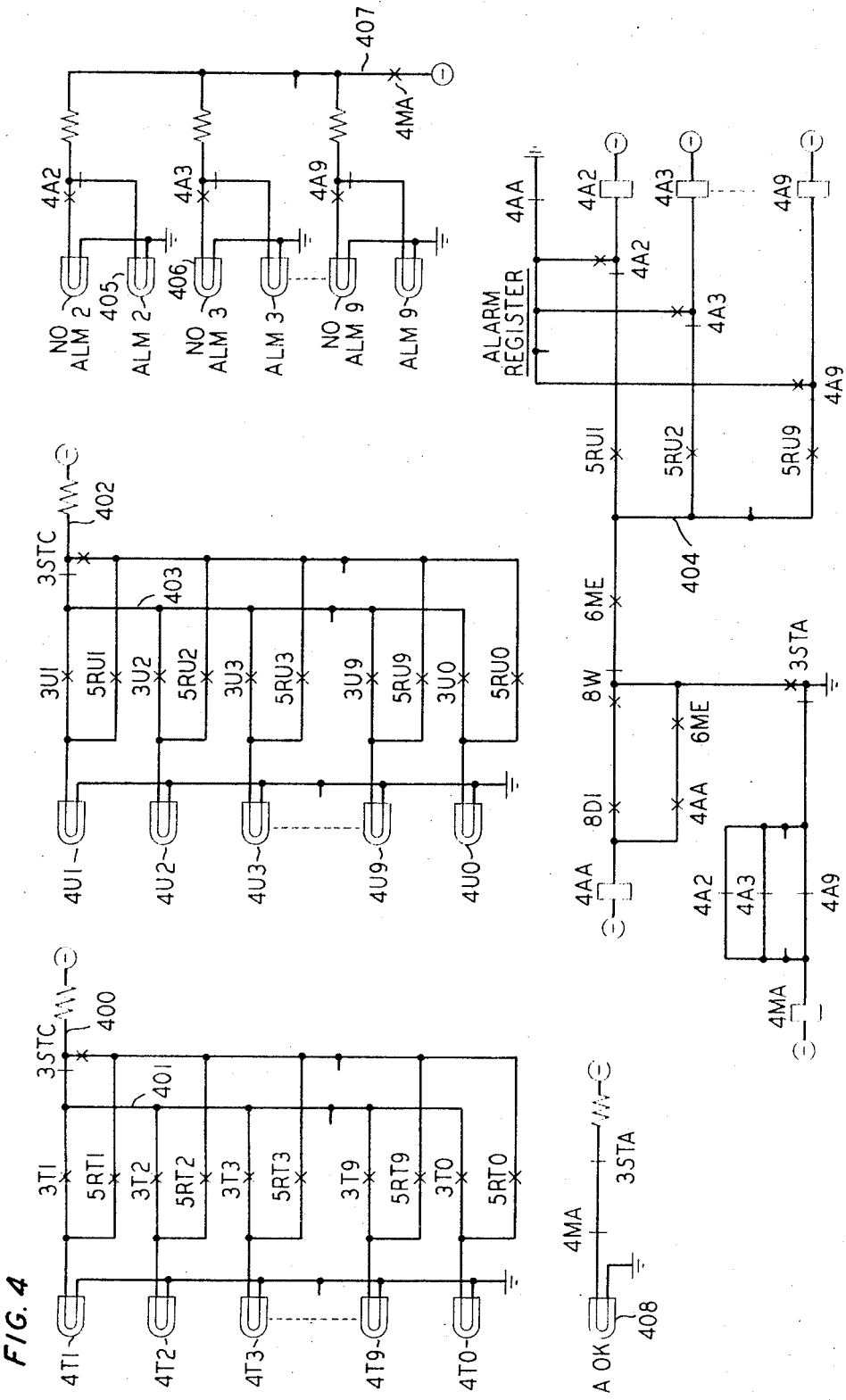
Figure 5:
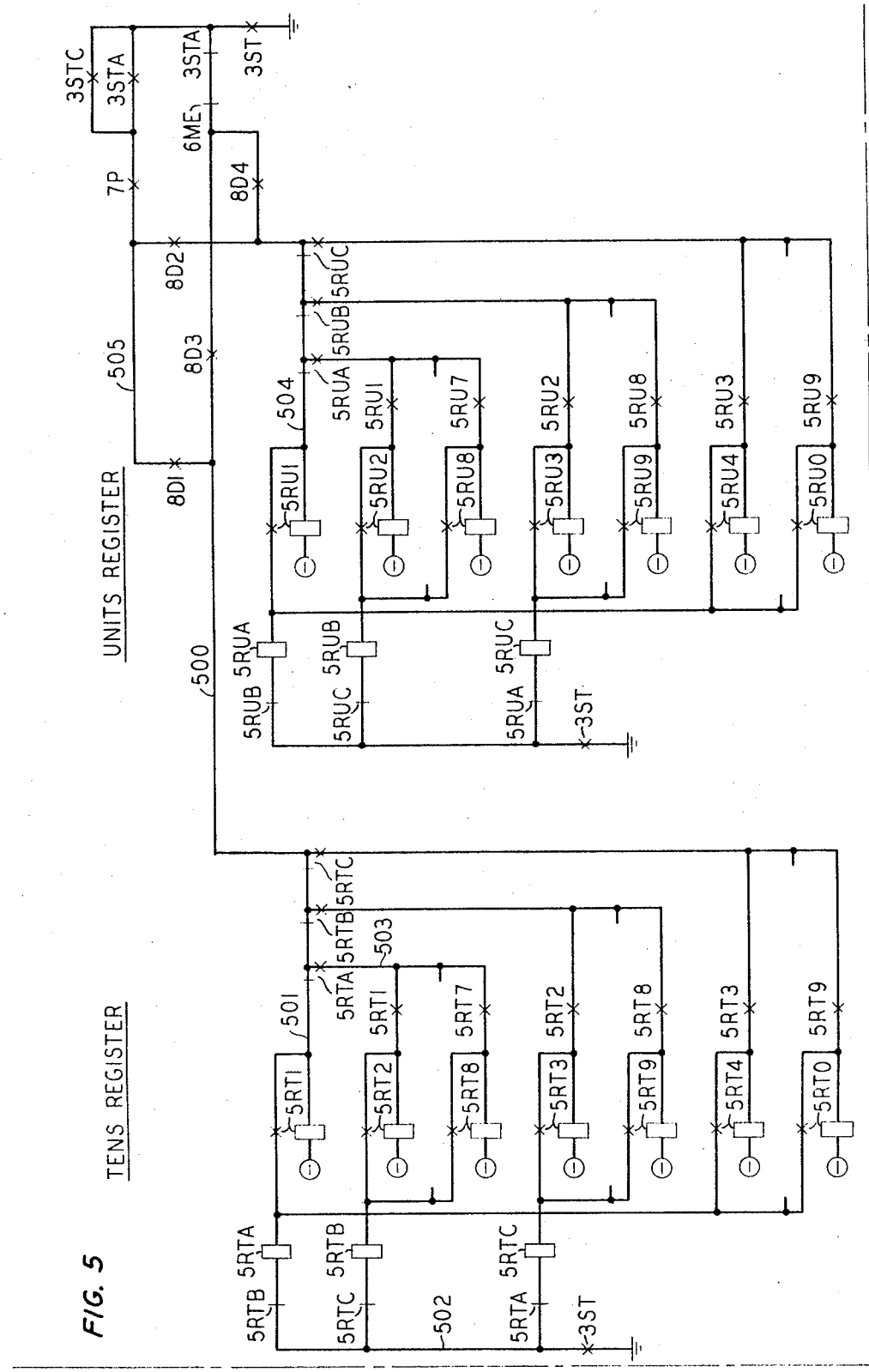
Figure 6:
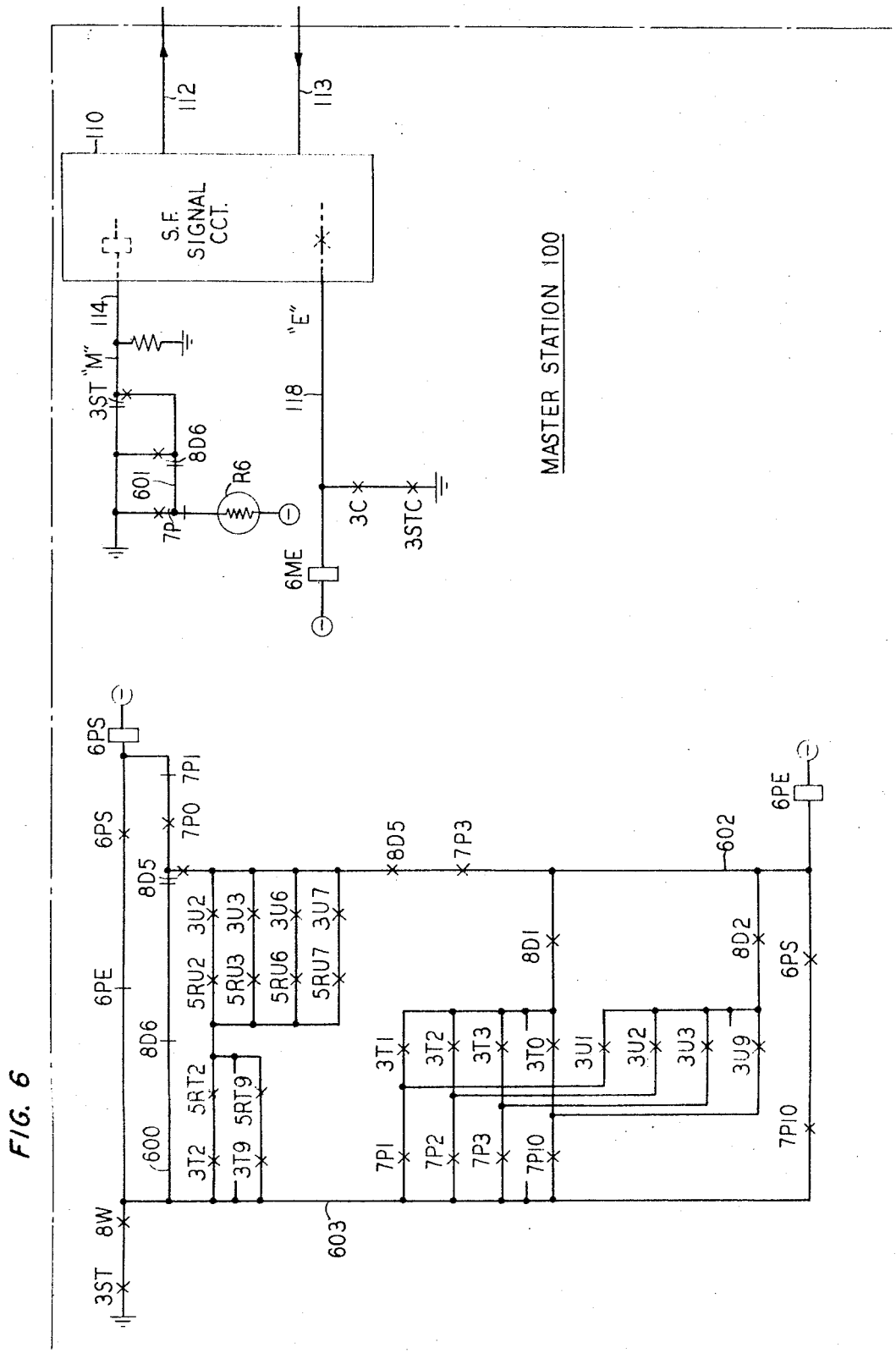
Figure 7:
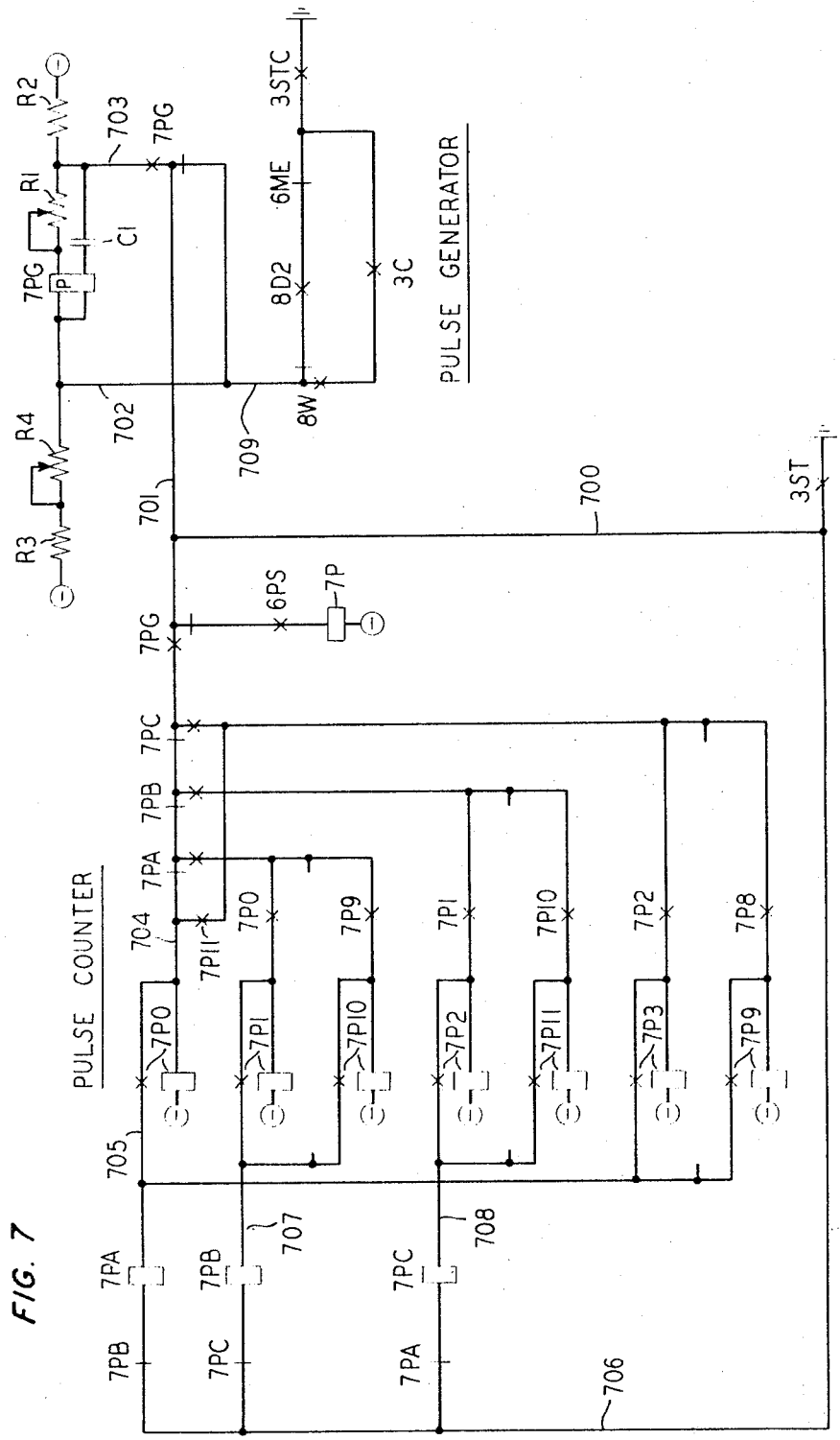
Figure 8:
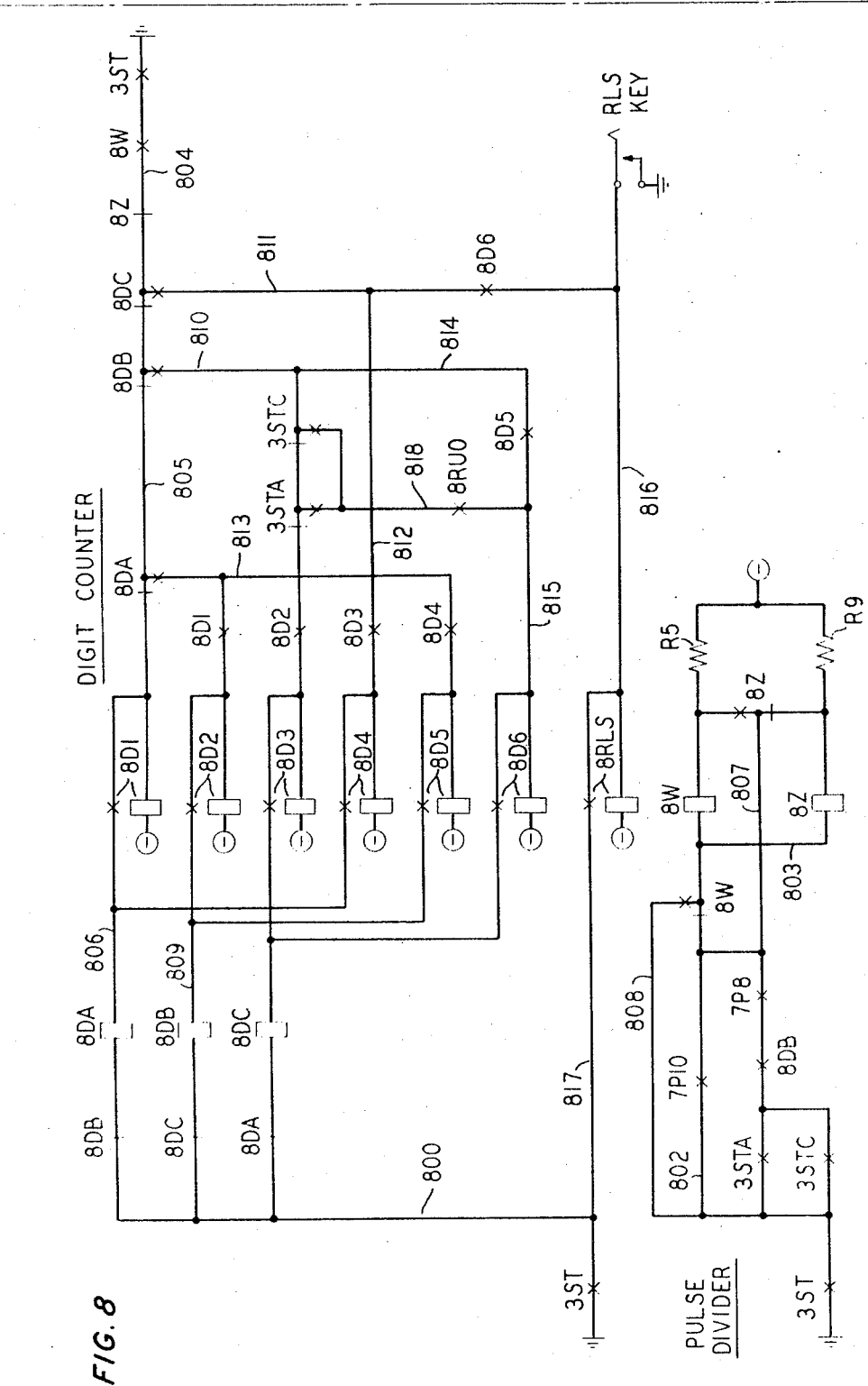
Figure 9:
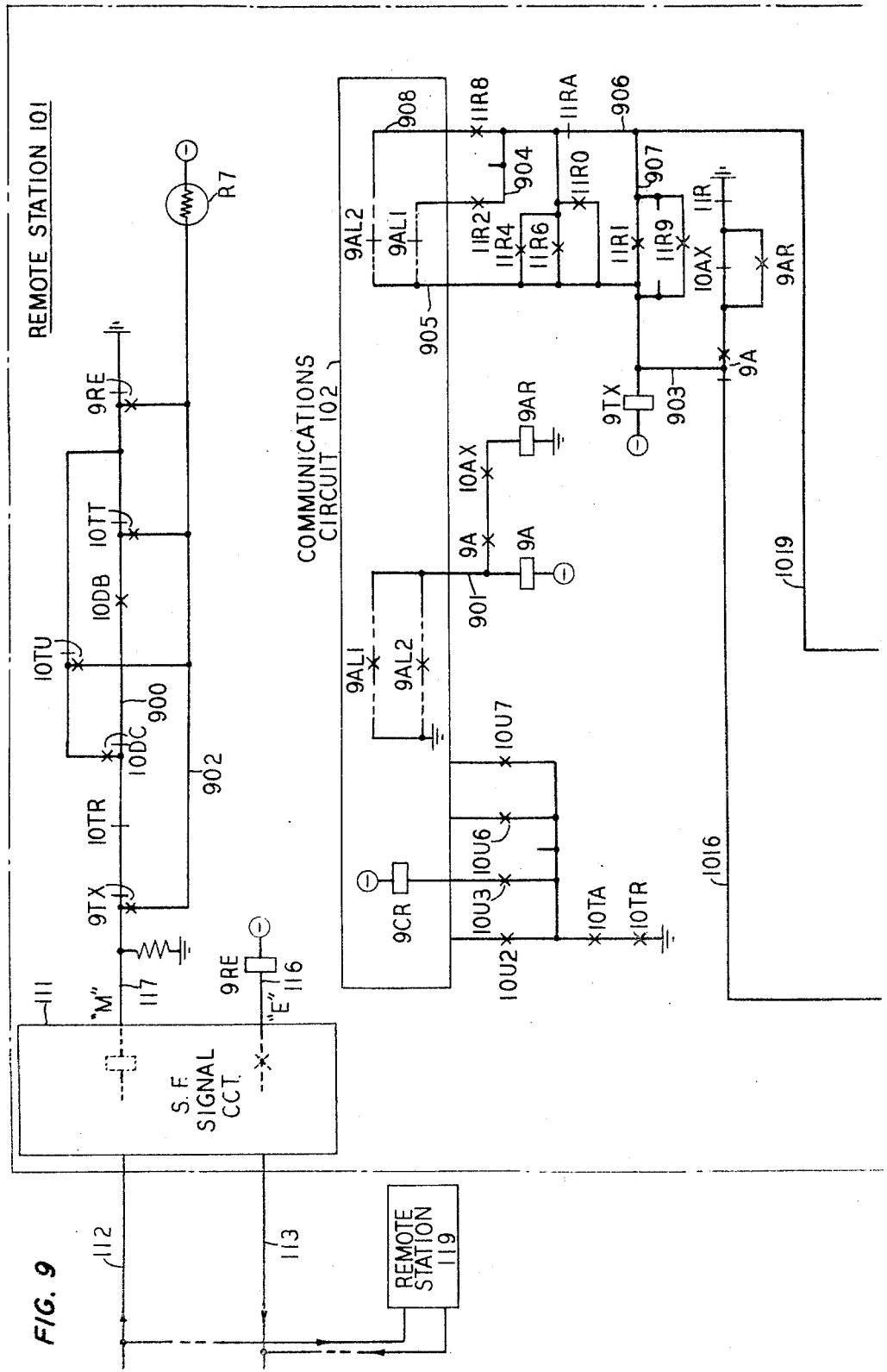
Figure 10:
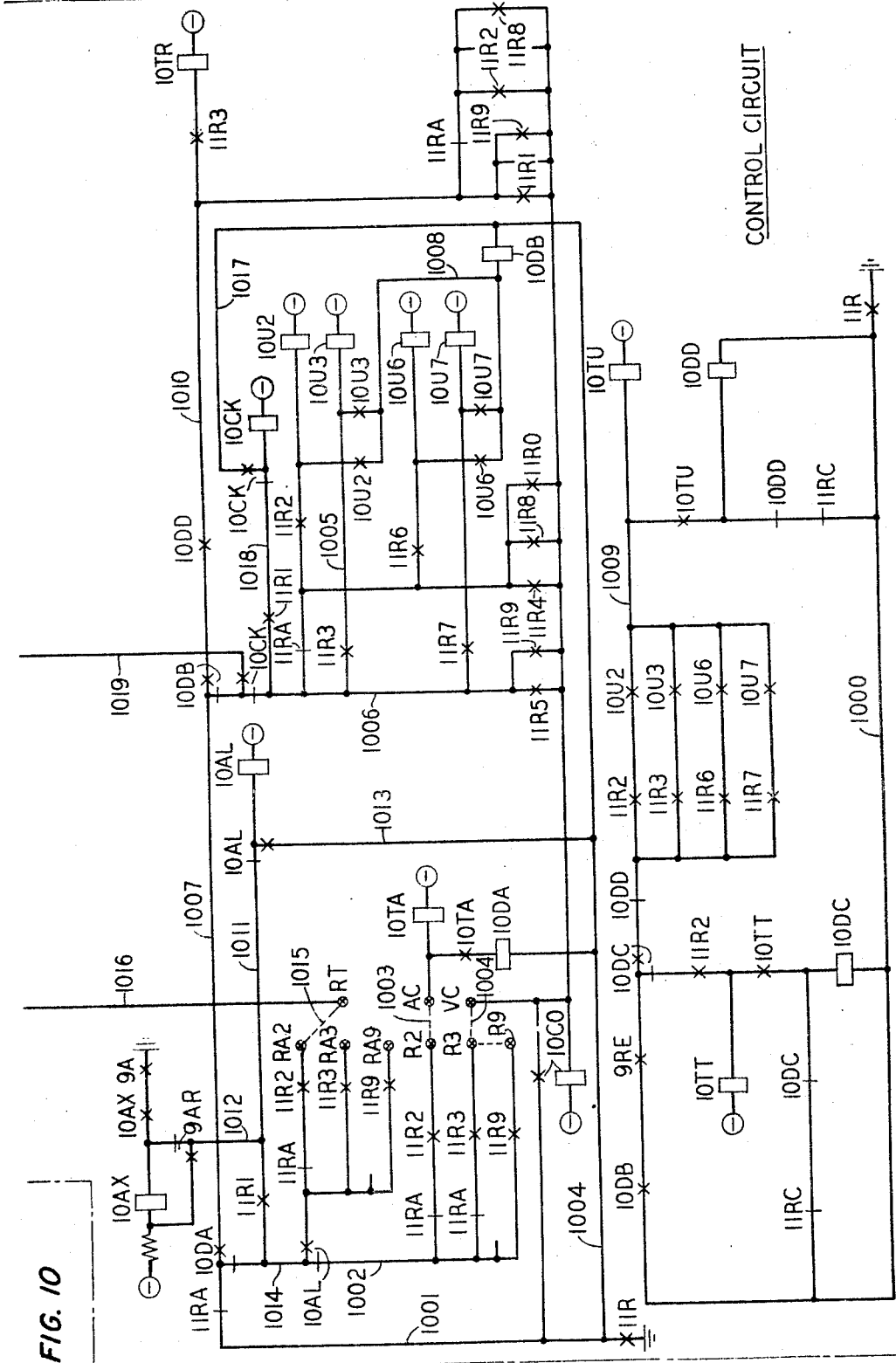

FIGS. 3–11 when arranged in accordance with FIG. 2 depict the same remote control switching system which is symbolically shown in the block diagram of FIG. 1. More specifically, FIGS. 3 and 4 show part of the attendant's console at the master station including part of the selection and control circuit, the selection keys and certain of the lamps. FIG. 5 shows a portion of a register circuit at master station 100. FIG. 6 shows part of the circuitry for matching the selected codes with the answer-back codes and also the master station portion of the single frequency signaling system and FIGS. 7 and 8 show part of a pulse generator and digit counting circuit. FIGS. 9, 10 and 11, on the other hand, show equipment located at a remote station.

In order for the reader to more fully appreciate the arrangement contemplated, a description of the operation of the system will now be given wherein the attendant wishes to perform certain control functions at a remote station from the master station. This will be followed by a description of the system wherein a remote station encounters an alarm condition and requests that a roll call of the remote stations be taken by the master station.

Control of a remote station from the master station

Let it be assumed that the attendant at the master station 100 (FIGS. 3–8) desires to address remote station 101 (FIGS. 9–11) and execute a command thereat. As was assumed in the general description, the address code of the remote station 01 is represented by the digit 2 and the particular function to be performed at the remote station is responsive to the command signal transmitted as a digit 3 from the master office. The attendant at the master station 100, therefore, momentarily operates the selection keys 2 and 3 to address the remote station and transmit the command signal thereto.

Upon the operation of the selection key 2, ground is extended from normal contacts of relay 3UA, over conductor 300, through operated contacts of selection key 2, over conductor 301, normal contacts of relay 3TA, and through to the winding of relay 3T2 to battery, operating tens relay 3T2. Relay 3T2 closes its contacts in FIG. 4 to extend battery from conductor 400, through normal contacts of relay 3STC, over conductor 401, operated contacts of tens relay 3T2 and through lamp 4T2 to ground, lighting lamp 4T2 to inform the attendant that the tens digit 2 has been selected for the address code to be transmitted to the remote stations.

Relay 3T2 also closes its contacts in FIG. 3 to extend ground over conductor 303, through the winding of relay 3TA, over conductor 304 and through normal contacts of relay 8RLS to ground. Relay 3TA does not operate in this circuit, however, since it has ground on both sides of its winding, but when the attendant releases selection key 2 ground is removed from conductor 301 and relay 3TA operates over the previously traced circuit to battery through the winding of relay 3T2. Relay 3TA in operating transfers the conductors connected to the selection keys 0–9 from the tens selection relays 3T0–3T9 to the unit selection relays 3U0–3U9 in FIG. 3.

The attendant now actuates selection key 3 to prepare the master station for transmitting the command signal to the remote station. With selection key 3 operated, ground is extended from conductor 300, through operated contacts of key 3, over conductor 305, through operated contacts of relay 3TA, over conductor 306 and through the winding of units relay 3U3 to battery thereby operating relay 3U3.

Relay 3U3, in operating, closes its contacts in FIG. 4 to extend battery from conductor 402, through normal contacts of relay 3STC, over conductor 403, through operated contacts of relay 3U3 and through lamp 4U3 to ground, lighting units lamp 4U3 and informing the attendant that the master station has been prepared to transmit the command signal to the remote station.

Relay 3U3, in operating, also extends ground from conductor 306, through operated contacts of relay 3U3, over conductor 310, through the winding of relay 3UA and over conductor 311 to ground through normal contacts of relay 8RLS. Relay 3UA does not operate in this circuit, since as long as selection key 3 is held operated, the winding of relay 3U3 has ground on both sides. When the selection key 3 is released removing ground from conductor 306, relay 3UA is permitted to operate in series with the units relay 3U3.

When relay 3UA operates a circuit is completed from ground through normal contacts of relay 8RLS in FIG. 3, over conductor 304, operated contacts of relay 3UA and through the winding of start relay 3ST to battery, operating relay 3ST. Relay 3ST operates its contacts in FIG. 6 to connect negative battery through resistance R6 and normal contacts of relays 7P and 8D6 to M lead 114. Battery on M lead 114 causes single frequency signaling circuit 110 to remove tone from signaling channel 112 to operate relay 9RE at each remote station. Relay 9RE, in operating, operates relay 11R at the remote station to prepare the remote station for receiving pulses representing address and command codes.

Relay 3ST, in operating, also completes a circuit for operating a capacitor timed pulse generator in FIG. 7. Ground from operated contacts of start relay 3ST is extended over conductors 700 and 701, through normal contacts of relay 7PG, over conductor 702, the upper winding of relay 7PG and through resistances R1 and R2 to battery. A circuit is also completed for charging capacitor C1 through the lower winding of relay 7PG. The current flow through the upper winding of relay 7PG is in the operate direction while the current flow through the lower winding charges capacitor C1 in a direction to hold relay 7PG released thus delaying the operation of relay 7PG until capacitor C1 is substantially charged. When relay 7PG operates the operating ground on conductor 701 is extended over conductor 703 through resistance R1, the upper winding of relay 7PG in the non-operate direction and through resistances R4 and R3 to battery. Capacitor C1 is discharged through the lower winding in a direction to help hold the relay operated and the relay is held operated until capacitor C1 is substantially discharged. Thus, relay 7PG is timed in both the operate and release directions to provide a pulse speed of approximately ten pulses per second.

Pulse generating relay 7PG provides pulses for operating pulse counting relays (7P0–7P11) in FIG. 7 and pulsing relay 7P which controls single frequency signaling circuit 110 in FIG. 6. The number of pulses to be delivered to relay 7P is controlled by the contacts of pulse start relay 6PS and pulse end relay 6PE.

The pulse counting circuit in FIG. 7 comprises 12 counting relays 7P0–7P11 and steering relays 7PA, 7PB and 7PC, and the pulse counting circuit will continue to count pulses as long as the pulse generator is in operation. For example, upon the initial operation of relay 7PG ground is extended from conductor 700, through operated contacts of relay 7PG, through normal contacts of relays 7PC, 7PB and 7PA, over conductor 704 and through the winding of relay 7P0 to battery, operating relay 7P0. Relay 7P0, in operating, extends the ground on conductor 704 through its own contacts, over conductor 705, through the winding of relay 7PA, normal contacts of relay 7PB, over conductor 706 and through operated contacts of relay 3ST to ground. While relay 7PG is operated, relay 7PA has ground on both sides of its winding and does not operate, but when relay 7PG releases removing ground from conductor 704, relay 7PA operates in series with the winding of relay 7P0.

On the next operation of relay 7PG the ground from conductor 700 is extended through operated contacts of steering relay 7PA and counting relay 7P0 to operate the next counting relay 7P1. Relay 7P1, in operating, extends its operating ground over conductor 707, through the winding of steering relay 7PB and normal contacts of relay 7PC to ground on conductor 706. Relay 7PB is shunted down, having ground on both sides of its winding, but when pulse generator relay 7PG releases again, relay 7PB is permitted to operate in series with relay 7P1.

When relay 7P1 operates it opens the holding circuit for relays 7PA and 7P0 which release. In addition, the operated relay 7PB prepares a path for operating counting relay 7P2 upon the next operation of pulse generator relay 7PG.

Thus, each time relay 7PG operates the next succeeding counting relay (7P–) operates and upon the release of relay 7PG the next steering relay (7PA, 7PB or 7PC) operates to release the prior steering and counting relays.

The pulse counting circuit continues to count the pulses supplied by the operation of pulse generator relay 7PG in the same manner until the eleventh pulse when relay 7P10 operates. Relay 7P10, in operating, completes a circuit for operating relay 8W in FIG. 8. This circuit can be traced from ground through operated contacts of relay 3ST, over conductor 802, through operated contacts of relay 7P10 and through normal contacts of relay 8W, the winding of relay 8W and resistance R5 to battery. The same ground that operated relay 8W is extended over conductor 803 to the winding of relay 8Z. Relay 8Z does not operate at this time, however, since it is shunted down by ground over conductor 807 and through normal contacts of relay 8Z to the other side of its winding.

Relays 8W and 8Z comprise a pulse divider circuit which operates on successive cycles of the pulse counter (relays 7P0–7P11) in FIG. 7 to advance the digit counter (relays 801–806) in FIG. 8. More specifically, during alternate odd-numbered cycles of the pulse counter relays 8W and 8Z operate to advance the digit counter one step, and during the even-numbered cycles relays 8W and 8Z release to prepare for advancing the digit counter on the next odd-numbered cycle.

The digit counting relays 801–806 in conjunction with the pulse start relay 6PS, the pulse end relay 6PE and the tens and units selection relays 3T– and 3U–, respectively, control the outpulsing of various digits to the remote station.

Returning now to a description of the operation of the master station relay 8W, in operating, extends ground from operated contacts of relay 3ST in FIG. 8, over conductor 804, through normal contacts of relays 8Z, 8DC and 8DB, over conductor 805, through normal contacts of relay 8DA and through the winding of digit counting relay 8D1 to battery. Relay 8D1 operates over this circuit and extends its operating ground over conductor 806 to the winding of relay 8DA which does not operate at this time since it has ground on the other side of its winding from contacts of relay 3ST, over conductor 800 and through the normal contacts of relay 8DB.

Relay 7PG once again releases removing the shunt from relay 7PB which operates in series with counting relay 7P10, and relay 7PB releases steering relay 7PA and the previously operating counting relay 7P9. The next operation of the pulse generator relay 7PG causes the next counting relay 7P11 to operate, and relay 7P11 extends its operating ground over conductor 708 to the right side of the winding of relay 7PC. Relay 7PC does not operate at this time since it has ground on the other side of its winding via conductor 706 and normal contacts of relay 7PA. When relay 7PG releases, however, the shunt is removed from relay 7PC, and relay 7PC operates in series with the winding of counting relay 7P11.

Relay 7PC, in operating, releases steering relay 7PB and counting relay 7P10. Relay 7P10, in releasing, removes the shunt from relay 8Z which operates in a circuit traced from ground through operated contacts of relay 3ST, over conductor 808, through operated contacts of relay 8W, over conductor 803, through the winding of relay 8Z and through resistance R9 to battery. When relay 8Z operates it opens its contacts in FIG. 8 to remove ground from conductor 805 permitting steering relay 8DA to operate.

Up to this point the pulse counting circuit has gone through one cycle (7P0 through 7P11) but no pulses have been transmitted to the remote stations. As will be described subsequently the pulse counting circuit, by only outpulsing on alternate cycles, will provide an interdigital timing interval when a series of codes are to be transmitted to the remote stations. The next operation of pulse generator relay 7PG causes the pulse counter to go into its second cycle and the first stage counting relay 7P0 to operate. With relays 8W and 7P0 operated a circuit is completed for operating pulse start relay 6PS. This circuit can be traced from battery in FIG. 6, through the winding of relay 6PS, through normal contacts of relay 7P1, operated contacts of relay 7P0 and normal contacts of relays 8D5 and 8D6, over conductor 600 and through the operated contacts of relays 8W and 3ST to ground.

With the pulse start relay 6PS operated, pulsing relay 7P in FIG. 7 will follow the pulses of the pulse generator, and the pulses will be transmitted by the single frequency signaling circuit 110 to the remote stations. More specifically, each time pulse generator relay 7PG releases, the ground on conductor 700 is extended through normal contacts of relay 7PG and through the operated contacts of relay 6PS to operate relay 7P, and each time relay 7PG operates relay 7P releases. Turning now to FIG. 6 it will be noted that when relay 7P operates, ground is connected over conductor 601, through normal contacts of relay 8D6 and through operated contacts of relay 3ST to M lead 114, and when relay 7P is released, battery is connected through resistance R6 to M lead 114. Thus, the M lead 114 is switched back and forth between ground potential and negative battery potential under control of relay 7P, and when ground potential is applied to M lead 114, single frequency signaling circuit 110 transmits tone over channel 112 to the remote stations. Conversely, when battery is connected to M lead 114, tone is removed from channel 112.

At the remote station when tone is being received, relays, such as relay 9RE in FIG. 9 for remote station 101, are released, and when tone is removed from line 112, ground is transmitted over E lead 116 to operate receive relay 9RE. In a similar manner, battery connected to M lead 117 at the remote station 101 causes the closure on E lead 118 at the master station to operate receive relay 6ME thereat.

Pulse start relay 6PS having operated as a result of the operation of pulse counting relay 7P0 during the second cycle, the pulse generator relay 7PG continues to pulse thereby operating successive counting relays (7P1–7P11) and relay 7P transmits the pulses via the single frequency signaling system to the remote station. Since the first digit to be outpulsed to the remote stations is a 2, only two pulses will be transmitted in accordance with the following description.

Upon the release of relay 7PG after the operation of pulse start relay 6PS, the shunt from around relay 7PA is removed, permitting relay 7PA to be operated in series with relay 7P0. Relay 7P also operates over the previously traced path, and in operating, transfers M lead 114 from battery to ground. When relay 7PA operates it prepares an operating path for the next counting relay 7P1. The next operation of relay 7PG releases pulsing relay 7P and operates counting relay 7P1. Relay 7P in operating transfers the M lead 114 from ground back to battery thus transmitting the first pulse of the digit 2 to the remote stations.

Relay 7P1 in operating also opens the operating path for pulse start relay 6PS. However, relay 6PS is held operated by a locking circuit traced through its own contacts and through normal contacts of pulse end relay 6PE to ground through operated contacts of relays 8W and 3ST.

Pulse generator relay 7PG reoperates and releases to release and reoperate pulsing relay 7P thus transmitting the second pulse of the address code in the same manner and also operating the next pulse counting relay 7P2.

With pulse counting relay 7P2 operated and tens relays 3T2 operated as a result of the initial selection by the attendant, a circuit is closed for operating pulse end relay 6PE. This circuit can be traced from battery through the winding of relay 6PE, over conductor 602, through operated contacts of relays 8D1, 3T2 and 7P2, and over conductor 603 to ground through operated contacts of relays 8W and 3ST. Relay 6PE, in operating, opens the locking circuit for relay 6PS which releases. In releasing, relay 6PS disconnects pulsing relay 7P from the contacts of pulse generator relay 7PG so that relay 7P no longer follows the pulse generator although the pulse generator continues to provide pulses. With relay 7P released, steady battery is connected to M lead 114 and relay 9RE at the remote station 101 remains operated.

Thus, two pulses representing the digit 2 which is the address code of station 101 have been transmitted over channel 116 to the remote stations.

Although pulses are no longer being transmitted to the remote stations the pulse generator and pulse counting circuitry at the master station continues to function. When the pulse counting circuitry in FIG. 7 registers a pulse to operate counting relay 7P10, the circuit prepares itself for the transmission of the next code to the remote station. Relay 7P10, in operating, completes a circuit for shunting down relay 8W which is part of the pulse divider circuit comprising relays 8W and 8Z. The circuit for shunting down relay 8W can be traced from ground on operated contacts of relay 3ST, over conductor 802, operated contacts of relay 7P10, over conductor 807 and through operated contacts of relay 8Z to the right side of the winding of relay 8W. Relay 8W having ground on both sides of its winding releases. Although relay 8Z was held through operated contacts of relay 8W, relay 8Z does not release at this time since relay 8Z will hold operated by a ground on conductor 802, through operated contacts of relay 7P10 and normal contacts of relay 8W. Relay 8Z holds over this path until the pulse counter advances to a position where relays 7P11 and 7PC are operated to release relay 7P10. The pulse divider (relays 8W and 8Z) has now been recycled in preparation for advancing the digit counter and transmitting the next code.

The pulse counter continues to count from the twelfth step (relay 7P11) back to the first step 7P0, and so on, in the same manner as previously described. The time interval occupied by relays 7P0–7P10, which are counting pulses during the third cycle until the reoperation of pulse divider relays 8W and 8Z, is used for interdigital timing to allow sufficient time for equipment at the remote stations to advance in preparation for receiving the next digit to be transmitted by the master station.

When pulse counting relay 7P10 operates after this time interval, a path for reoperating relay 8W is once again completed and relay 8W operates. In operating, relay 8W closes a circuit for operating the next digit counting relay 8D2. This circuit can be traced from ground through operated contacts of relays 3ST and 8W, over conductor 804, normal contacts of relays 8Z, 8DC and 8DB, over conductor 805, operated contacts of relays 8DA and 8D1 and through the winding of relay 8D2 to battery. Relay 8D2 extends the operating ground through its operated contacts and over conductor 809 to the winding of steering relay 8DB which does not operate at this time since it has ground on both sides of its winding. Upon the subsequent release of pulse counting relay 7P11 the steering relay 7PC and counting relay 7P10 are released removing the shunt from relay 8Z and permitting it to operate in the same manner as previously described.

Relay 8Z, in operating, disconnects the ground from conductor 805 allowing relay 8DB to operate in series with digit counting relay 8D2. Relay 8DB opens a holding circuit for relays 8DA and 8D1 which release.

The pulse counter in FIG. 7 continues to count until relay 7P0 operates beginning the fourth cycle, and relay 7P0 completes the previously traced circuit for operating pulse start relay 6PS in FIG. 6. With pulse start relay 6PS operated, relay 7P will again follow the pulses generated by pulse generating relay 7PG, and in following the pulses, relay 7P will alternately connect battery and ground to M lead 114 to actuate single frequency signaling circuit 110 and transmit the pulses to the remote stations.

Pulse start relay 6PS will remain operated until three pulses indicating the digit 3 of the command signal have been sent to the remote stations. When the third pulse has been sent relay 7P3 will have been operated, and a path is completed for operating pulse end relay 6PE. This circuit can be traced from battery through the winding of relay 6PE, over conductor 602, through operated contacts of relay 8D2, operated contacts of units relay 3U3, operated contacts of pulse counting relay 7P3 and over conductor 603 to ground through operated contacts of relays 8W and 3ST.

Receipt of address code at remote station

Before describing the subsequent operations at the master station, a description of the operation at the remote station in response to the receipt of the codes transmitted from the master station will first be given.

It will be recalled from the above description that upon the operation of a selection key at the master station relay 3ST operated thereat to connect battery over the M lead 114 to single frequency signaling circuit 110. Battery on M lead 114 causes the tone to be removed from channel 112 and relay 9RE to be operated at all remote stations.

Relay 9RE closes its contacts in FIG. 11 to operate slow release relay 11R and prepare the remote station for receiving subsequent codes to be outpulsed from the master station. Nothing further happens at the remote station at this time until the first digit is outpulsed and each pulse of the digit is represented by an open and closure of E lead 116 which releases and operates relay 9RE.

Since it has been assumed that the digit 2 is the address code to be outpulsed from the master station, relay 9RE will release and reoperate twice in step with the pulses from the master station. Upon the first release of relay 9RE, ground is extended over conductor 1100 through operated contacts of relay 11R through normal contacts of relay 10C0 to operate relay 11RA. With relay 11RA operated the same ground is extended over conductor 1101, through normal contacts of relays 11SC, 11SB and 11SA, over conductor 1102 and through the winding of relay 11R1 to battery, operating relay 11R1. Both relays 11R and 11RA have slow release characteristics and will hold operated during pulsing.

Relay 11R1 in operating extends the ground on conductor 1102 through its own contacts to the winding of relay 11SA. Relay 11SA does not operate, however, since ground is present on the other side of its winding in a circuit traced from operated contacts of relay 11R, normal contacts of relay 11RC, over conductor 1104 and through normal contacts of relay 11SB. At the end of the first pulse when relay 9RE operates ground is removed from conductor 1102 and relay 11SA is permitted to operate in series with the winding of relay 11R1.

Upon receipt of the second pulse relay 9RE releases completing a circuit over the previously traced path through operated contacts of relay 11SA, over conductor 1103 and through the winding of counting relay 11R2 to battery, operating relay 11R2. This same ground is extended through the operated contacts of relay 11R2 to the winding of relay 11SB which does not operate at this time due to the ground on conductor 1104 being connected to the other side of the winding.

At the end of the second pulse, pulsing relay 7P at the master station releases and tone is removed from signaling channel 112 to the remote stations thus steadily operating relay 9RE and holding relay 11R operated. The steady operation of relay 9RE removes ground from conductor 1100 releasing relay 11RA and permitting relay 11SB to operate in series with counting relay 11R2. With counting relay 11R2 operated a circuit is completed for operating relay 10TA in FIG. 10. This circuit can be traced from ground through operated contacts of relay 11R over conductor 1001, normal contacts of relays 11RA, 10DA and 10AL, over conductor 1002, normal contacts of relay 11RA, operated contacts of relay 11R2 to punching R2, over cross-connection 1003 to address code punching AC and through the winding of relay 10TA to battery.

Since it has been assumed that the remote station 101 depicted in FIGS. 9–11 has been assigned the address code 2, the address code punching AC at that station is cross-connected to punching R2, and relay 10TA operates when remote station 101 receives the digit 2. At other remote stations the address code punchings (AC) would be connected to different R-- punchings so that relays comparable to relay 10TA at remote station 101 would not operate at the other remote stations, but a cutoff relay similar to relay 10C0 would have operated to lock out these other remote stations. Likewise, if an address code other than a digit 2 is transmitted, relay 10TA in FIG. 10 would not operate, but a circuit would be completed for operating relay 10C0 at remote station 101. For example, if the address code 3 representing another remote station was transmitted, counting relay 11R3 would be operated to extend ground over the previously traced circuit, over cross-connection 1004, and through the winding of relay 10C0 to battery, operating relay 10C0. Relay 10C0, in operating, disconnects the contacts of pulse receiving relay 9RE from the counting circuit (11R0–11R9) and prevents remote station 101 from responding to further command signals.

Remote station 101 having been properly addressed, relay 10TA operates and completes a path for operating recycle counting relay 11RC. This circuit can be traced from battery through the winding of relay 11RC, normal contacts of relay 10DA, operated contacts of relay 10TA, over conductor 1107 and through operated contacts of relay 11R to ground. The ground which operated relay 10TA is also extended through contacts of relay 10TA to the winding of relay 10DA. Relay 10DA does not operate at this time since it has ground on the other side of its winding from conductor 1004.

When recycle counting relay 11RC operates it removes ground from conductor 1104 interrupting the holding circuit for relays 11R2 and 11SB and these relays release restoring the counting circuit in FIG. 11 to normal. Relay 11R2 in releasing removes the shunting ground from one side of the winding of relay 10DA, allowing relay 10DA to operate in series with relay 10TA. Relay 10DA, in operating, releases relay 11RC in FIG. 11, and the counting circuit is restored to normal in preparation for receiving the command signal.

Nothing further happens at the remote station until the next digit, i.e., the command signal, is received from the master station. It will be remembered that the digit 3 has been selected as a command signal to be transmitted from the master station and this digit is received at the remote station as three successive pulses on E lead 116 in FIG. 9.

The counting circuit in FIG. 11 operates as before following the pulses of receive relay 9RE. At the beginning of the third pulse slow release relays 11R and 11RA are operated from the previous pulses and relay 9RE releases extending ground over conductor 1100, through operated contacts of relay 11R, normal contacts of relay 10C0, operated contacts of relay 11RA, over conductor 1101, through normal contacts of relay 11SC, operated contacts of relay 11SB, over conductor 1105 through operated contacts of relay 11R2 and through the winding of counting relay 11R3, operating relay 11R3. The same ground is extended through the operated contacts of relay 11R3 and over conductor 1106 to the winding of relay 11SC. Relay 11SC does not operate at this time since the other side of its winding is connected to ground on conductor 1104.

At the end of the third pulse relay 9RE remains operated permitting slow release relay 11RA to release. The operation of relay 9RE also removes the shunting ground from the conductors 1105 and 1106 permitting steering relay 11SC to operate in series with the winding of relay 11R3. Relay 11SC, in operating, opens the holding circuit for the previously operated steering relay 11SB and counting relay 11R2 and these relays release.

With relay 11R3 operated and relay 11RA released a circuit is completed for operating relay 10U3. This circuit can be traced from ground through contacts of relay 11R, over conductor 1001, through normal contacts of relay 11RA, operated contacts of relay 10DA, over conductor 1007, through normal contacts of relays 10DB and 10CK, over conductor 1006, through operated contacts of relay 11R3, over conductor 1005 and through the winding of relay 10U3 to battery. This same ground is extended through operated contacts of relay 10U3 and over conductor 1008 to the winding of relay 10DB. However, relay 10DB has ground over conductor 1004 connected to the other side of its winding and, therefore, does not operate at this time.

When relay 10U3 operates a circuit is completed in FIG. 11 for operating recycle counting relay 11RC. This circuit can be traced from battery through the winding of that relay, through operated contacts of relay 10U3, normal contacts of relay 10DB and over conductor 1107 to ground on the operated contacts of relay 11R. Relay 11RC in operating removes the ground from conductor 1104 thereby releasing counting relay 11R3 and steering relay 11SC.

When relay 11R3 releases it removes the shunting ground from conductor 1005 thereby permitting relay 10DB to operate in series with relay 10U3. Relay 10DB opens its contacts in FIG. 11 interrupting the operating circuit for relay 11RC which releases. Relay 10DB also closes its contacts in FIG. 9 to connect battery to M lead 117. This circuit can be traced from negative battery through resistance R7, through operated contacts of relay 9RE, normal contacts of relay 10TT, operated contacts of relay 10DB, over conductor 900, through normal contacts of relays 10DC, 10TR and 9TX and over M lead 117 to single frequency signaling circuit 111. When battery is connected to the M lead, tone is removed from channel 113, and the removal of tone from channel 113 causes single frequency signaling circuit 110 at the master station to connect ground over E lead 118 and through the winding of relay 6ME to battery, operating relay 6ME. The operation of relay 6ME indicates to the master station that the remote station has received the address code and command signal and is waiting for the transmission of signals from the master station to verify that the proper signals have been registered at the remote station before an execute signal is sent to the remote station.

Transmission of verification signals to the addressed remote station

It will be remembered from the general description that the master station transmitted an address code and command signal to the remote stations and verified that the proper signals were registered at the addressed remote station by receiving an answer-back signal in accordance with the information registered at the addressed remote station. In accordance with one feature of the invention the answer-back signal to the master station is, in effect, a reflection of signals originating at the master station.

The signals are modified, however, to denote what signals were previously sent to and registered at the remote station.

In this illustrative embodiment of the invention pulse type signaling is used between stations and two pulse trains were priorly transmitted from the master station to the remote station. The first pulse train comprised two pulses representing the address code of station 101, and the second pulse train comprised three pulses representing a particular command signal to be executed at the remote station. To verify that these signals have been registered at the remote station, two verification pulse trains of ten pulses each will now be transmitted and reflected back to the master station. The remote station will, of course, only reflect two pulses of the first verification pulse train and three pulses of the second verification pulse train to indicate that the digits 2 and 3 have been registered at the remote station. The signals have been called verification signals to facilitate the description and distinguish their function from the other signals mentioned, such as the command and address code signals. It will be realized, however, that in this illustrative embodiment all signaling at the stations is of the direct-current pulse type; however, other type signaling may be used without departing from the spirit and scope of the invention.

Up to this point, the pulse generator in FIG. 7 is still generating pulses and the counting circuitry (7P0 through 7P11) has gone through four cycles transmitting digits to the remote stations on the even-numbered cycles and using the odd-numbered cycles for interdigital timing. Near the end of the fifth cycle which provides the interdigital timing between the command code signal and the first verification signal, counting relay 7P10 operates to operate relay 8W in the same manner as previously described.

Relay 8W, in operating, connects ground over conductor 804, through normal contacts of relays 8Z and 8DC, operated contacts of relay 8DB, over conductor 810, through normal contacts of relays 3STC and 3STA, operated contacts of relay 8D2 and through the winding of digit counting relay 8D3 to battery, operating relay 8D3 and extending ground to steering relay 8DC which does not operate at this time due to its having ground on the other side of its winding. Subsequent operation and release of pulse generator relay 7PG causes counting relay 7P11 and steering relay 7PC to operate, releasing priorly operated relays 7P10 and 7PB. With relay 7P10 released, relay 8Z is permitted to operate in a circuit traced from ground through operated contacts of relay 3ST, over conductor 808, operated contacts of relay 8W, over conductor 803, through the winding of relay 8Z and throught resistance R9 to battery. Relay 8Z removes the shunting ground from conductor 810 permitting relay 8DC to operate in series with the winding of relay 8D3. When relay 8DC operates, it also opens a holding path for relays 8DB and 8D2 which release.

The pulse generator relay 7PG releases and reoperates to operate counting relay 7P0, and relay 7P0 completes the previously traced circuit for operating pulse start relay 6PS in FIG. 6. Relay 6PS, it will be recalled, connects the pulsing relay 7P to the contacts of pulse generating relay 7PG, and relay 7P controls the connection of battery and ground over M lead 114 to single frequency signaling circuit 110. The relay 7P will, therefore, cause single frequency signaling circuit 110 to alternately transmit and remove tone from channel 112 to the single frequency signaling circuit 111 at the remote station 101.

Each time the master station relay 7P releases, battery is connected to M lead 114 causing tone to be removed from channel 112 and remote station relay 9RE to operate, and when master station relay 7P operates ground is connected to M lead 114 causing tone to be transmitted to single frequency signalling circuit 111 and relay 9RE thereto to release.

Relay 9RE in the following pulses from the master station causes the pulses to be reflected back to the master station by alternately connecting battery and ground over M lead 117 to single frequency signaling circuit 111. More specifically, when relay 7P at the master station releases removing tone from channel 112, relay 9RE operates to connect battery through resistance R7 over the previously traced path to M lead 117. Battery on M lead 117 causes tone to be removed from signaling channel 113 and single frequency signal circuit 110 responds by operating relay 6ME at the master station. Conversely, whenever pulsing relay 7P at the master station operates to connect ground to M lead 117, relay 9RE at the remote station releases to connect ground to M lead 117. Ground on M lead 117 causes tone to be transmitted over line 113 to the master station single frequency signaling circuit 110 releasing relay 6ME thereat.

Thus, pulses transmitted by master station relay 7P are reflected back to actuate receiving relay 6ME at the master station as long as relay 9RE at the remote station is permitted to alternately connect battery and ground to M lead 117 thereat. The number of pulses to be reflected will depend on the digits previously registered at the remote station as will now be described.

The release and operation of relay 9RE causes relays 11R and 11RA to respond in the manner previously described thereby permitting receive relay 9RE to actuate the pulse counting circuit in FIG. 11. Upon the first rerelease of relay 9RE, relay 11RA operates permitting counting relay 11R1 to operate. Relays 11R and 11RA are slow release relays and remain operated for the duration of each digit. Upon the next operation of relay 9RE, the shunt is removed from around the steering relay 11SA, and it operates completing a path for operating the second counting relay 11R2 when relay 9RE once again releases. Subsequent operation of the relay 9RE removes the shunting ground from conductor 1103 permitting steering relay 11SB to operate, which releases the previously operated steering relay 11SA and the counting relay 11R1.

It will be recalled from the prior description that relay 10DB operated upon the registration of a command signal after remote station 101 has responded to its address code, the digit 2. With relay 11R2 now operated, indicating the receipt of the first two pulses of the first ten pulse verification signal, a circuit is completed for operating relay 10TT to stop the pulses which are being received from the master station from being reflected back thereto.

The circuit for operating relay 10TT can be traced from ground through operated contacts of relay 11R, over conductor 1000, through operated contacts of relays 10DB and 9RE, normal contacts of relay 10DC, operated contacts of relay 11R2 and through the winding of relay 10TT to battery. Relay 10TT, in operating, extends its operating ground to the winding of 10DC which does not operate at this time since it has ground on the other side of its winding via conductor 1000.

Relay 10TT, in operating, also connects battery through resistance R7 to M lead 117 independently of the contacts of the relay 9RE which is following the pulses being transmitted from the master station. While relay 9RE continues to following the remaining 8 pulses of the ten pulse verification signal transmitted from the master station 100, steady battery on M leads 117 at the remote station causes tone to be removed from channel 113 to the master station, and relay 6ME remains operated thereat for the remainder of the verification signal pulse train.

Receipt at master station of reflected verification signal

Turning now to the master station 100 in FIGS. 3–8, it will be recalled that prior to the operation of relay 10TT at the remote station, each time pulsing relay 7P at the master station released, relay 9RE at the remote station operated to reflect a pulse-back over channel 113 to release relay 6ME at the master station. It will also be recalled that the digit counting relay 8D3 had operated prior to the transmission of the third digit which is the first verification signal.

Upon the initial release of relay 6ME when the first pulse is reflected back, a circuit is completed for operating tens registration relay 5RT1 in FIG. 5. This circuit can be traced from ground through operated contacts of relay 3ST, normal contacts of relays 3STA and 6ME, operated contacts of relay 8D3, over conductor 500, through normal contacts of relays 5RTC, 5RTB and 5RTA, over conductor 501 and through the winding of relay 5RT1 to battery. Relay 5RT1, in operating, extends its operating ground to the winding of steering relay 5RTA, but relay 5RTA does not operate at this time since it has ground on the other side of its winding via conductor 502 and the operated contacts of relay 3ST. When relay 6ME operates at the end of the first reflected pulse, the shunting ground is removed from conductor 501, and relay 5RTA operates in series with the winding of relay 5RT1.

Upon receipt of the second reflected pulse of the verification signal pulse train, relay 6ME releases extending ground over conductor 500 through the normal contacts of relays 5RTC and 5RTB, operated contacts of relay 5RTA, over conductor 503, through operated contacts of relay 5RT1 and through the winding of relay 5RT2 to battery, operating relay 5RT2. The same ground is extended through operated contacts of relay 5RT2 to the winding of steering relay 5RTB which does not operate at this time due to its having ground on both sides of its winding. At the end of the second reflected pulse relay 6ME operates removing the shunt from steering relay 5RTB, and relay 5RTB operates in series with counting relay 5RT2. The operation of relay 5RTB releases the previously operated counting relay 5RT1 and the steering relay 5RTA. Thus, the two reflected pulses are registered at the master station on the tens register relays (5RT–) in FIG. 5.

It will be remembered that after the second pulse was received at the remote station relay 10TT operated thereat to provide steady battery on M lead 117 at the remote station and block the reflection of further pulses back to the master station. This resulted in the holding of pulse receiving relay 6ME operated for the remaining eight pulses of the first verification pulse train. The pulse generator circuitry in FIG. 7, nevertheless, continues to furnish pulses to the counting circuitry therein (relays 7P-) through the remainder of the sixth cycle during which the ten pulse train verification signal is being transmitted to the remote station.

At the end of the tenth pulse, counting relay 7P10 is operated and a circuit is closed for operating pulse end relay 6PE. This circuit can be traced from battery through the winding of relay 6PE, through operated contacts of relays 6PS and 7P10, over conductor 603 and through operated contacts of relays 8W and 3ST to ground. Relay 6PE, in operating, releases pulse start relay 6PS which disconnects relay 7P from the pulse generator 7PG. Relay 7P releases thereby connecting steady negative battery over M lead 114 and stopping further pulses from being transmitted over channel 112 to the remote station. Steady battery on M lead 114 causes tone to be removed from channel 112, and relay 9RE at the remote station remains operated releasing relay 11RA in FIG. 11.

Relay 11RA, in releasing, extends ground from the operated contacts of relay 11R in FIG. 11 through operated contacts of relay 10TT and through normal contacts of relay 10DC to operate recycle relay 11RC. Relay 11RC recycles the counting circuit in FIG. 11 by releasing relay 11RO and 11SA which operated on the tenth pulse received from the master station. With relay 11RC operated, ground is removed from one side of the winding of relay 10DC, and it operates in a circuit traced from battery through the winding of relay 10TT, operated contacts of relay 10TT and through the winding of relay 10DC to ground on conductor 1000. When relay 10DC operates the negative battery potential connected to the M lead 117 at the remote station is once again placed under control of pulse receiving relay 9RE, and the remote station is now ready to receive the next verification signal pulse train from the master station.

During the recycling of the register at the remote station the pulse generator and counting circuit at the master station (FIG. 7) has been going through its seventh cycle, but no pulses are being transmitted to the remote station since relay 7P has been disconnected from the pulse generator relay 7PG. The seventh cycle and other odd numbered cycles furnish the interdigital timing interval as previously described.

Near the end of the seventh cycle, that is when relay 7P10 operates, relay 8W operates as previously described to operate the next digit counting relay 8D4. This circuit can be traced from ground through operated contacts of relays 3ST and 8W, over conductor 804, through normal contacts of relay 8Z, operated contacts of relay 8DC, over conductors 811 and 812, operated contacts of relay 8D3 and through the winding of relay 8D4 to battery.

Upon the receipt of the next pulse from pulse generating relay 7PG, pulse counting relay 7P11 and steering relay 7PC operate. Relay 7PC releases the priorly operated pulse counting relay 7P10, and the release of relay 7P10 permits relay 8Z to operate in the same manner as previously described. When relay 8Z operates the ground is removed from conductor 812, and relay 8DA operates in series with the winding of digit counting relay 8D4. Relay 8DA in operating releases the previously operated digit counting relay 8D3 and steering relay 8DC.

With digit counting relay 8D4 operated and relay 8D3 released, the contacts in FIG. 5 of pulse receiving relay 6ME are transferred from the tens register relays (5RT-) to the units register relays (5RU-).

In the same manner as previously described with respect to the transmission of other digits to the remote station, pulse generator relay 7PG continues to pulse the pulse counting relays 7P- until relay 7P0 operates. The operation of relay 7P0 completes the previously traced operating circuit for pulse start relay 6PS which operates.

When pulse start relay 6PS operates, pulsing relay 7P is once again connected to the pulse generator to begin transmitting the second verification signal pulse train to the remote station. In the same manner as described above, relay 7P alternately connects battery and ground to M lead 114 at the master station to cause relay 9RE at the remote station to operate and release. Relay 9RE in following the pulses from the master station alternately connects battery and ground to M lead 117 at the remote station which causes the operation and release of pulse receiving relay 6ME at the master station thereby reflecting the pulses received from the master station back to the master station.

In addition, relay 9RE actuates the counting circuit in FIG. 11 in the same manner as described above. When the counting circuit in FIG. 11 responds to the third pulse, relay 11R3 operates and upon the cessation of the third pulse steering relay 11SC operates to release the previously operated steering and counting relays.

With relay 11R3 operated a circuit is completed for operating relay 10TU in FIG. 10. This circuit can be traced from ground through contacts of relay 11R, over conductor 1000, operated contacts of relays 10DB, 9RE and 10DC, normal contacts of relay 10DD, through operated contacts of relays 11R3 and 10U3, over conductor 1009 and through the winding of relay 10TU to battery. The ground for operating relay 10TU is also extended through its operated contacts to the winding of relay 10DD, but relay 10DD having ground on the other side of its winding does not operate at this time.

When relay 10TU operates the negative battery through resistance R7 in FIG. 9 is once again connected to M lead 117 bypassing the pulsing contacts of relay 9RE. With steady battery connected to M lead 117 the pulses transmitted from the master station are no longer being reflected back to the master station, and relay 6ME thereat is held operated.

While the second verification signal pulse train comprising ten pulses is being transmitted to the remote station and relay 6ME at the master station was following the reflected pulses, the units register counting circuitry in FIG. 5 was registering the reflected pulses. Each time relay 6ME releases one of the relays 5RU- operates to register the receipt of a pulse. This register circuit is similar to the tens digit register (relays 5RT- etc.) and need not be described herein in detail. Instead it will be assumed that the units register (relays 5RU- etc.) has responded to the three pulses which have been reflected from the remote station to indicate that the command signal three is registered thereat. Register units relay 5RU3 and steering relay 5RUC would be operated at the end of the third pulse.

Although pulses are no longer being reflected back as indicated by the continuously operated pulse receiving relay 6ME at the master station, the pulse generator continues to function through its eighth cycle operating pulsing relay 7P and the pulse counting circuitry in FIG. 7, until the tenth pulse of the verification signal pulse train has been transmitted. When the tenth pulse is transmitted relay 7P10 operates and completes the operating circuit for pulse end relay 6PE which, in turn, disconnects the pulsing relay 7P from the pulse generator. Relay 7P releases and connects steady battery over M lead 114 to single frequency signaling circuit 110. The pulse generator continues to function causing the pulse counting circuitry in FIG. 7 to step through its ninth cycle which provides the interdigital timing interval between the transmission of the second verification pulse train and an execute signal which will be subsequently transmitted if the digits represented by the reflected pulses that have been registered at the master station match the digits which were initially selected by the attendant thereat. During the interdigital timing interval, the circuitry at the remote station 101 functions in a manner to that already described with respect to the receipt of the first verification digit at the remote station. Relay 9RE remains operated due to the signal from the master station and releases relay 11RA in FIG. 11. Relay 11RA, in releasing, extends ground through normal contacts of relay 10DD to operate recycle relay 11RC. Relay 11RC restores the counting circuitry in FIG. 11 by releasing relays 11R0 and 11SA. With relay 11RC operated, ground is removed from one side of the winding of relay 10DD and it operates in a circuit traced from battery through the winding of relay 10TU, operated contacts of relay 10TU, and through operated contacts of relay 11R to ground. The remote station is now ready to receive the execute signal from the master station.

When pulse counting relay 7P10 operates during the ninth cycle relay 8W in FIG. 8 also operates and completes a circuit for operating digit counting relay 8D5. This circuit can be traced from ground through operated contacts of relays 3ST and 8W, over conductor 804, normal contacts of relays 8Z, 8DC, and 8DB, over conductor 805, operated contacts of relay 8DA, over conductor 813, operated contacts of relay 8D4 and through the winding of relay 8D5 to battery. Upon the operation of the next pulse counting relay 7P11, relay 7PC operates to release the previously operated pulse counting relay 7P10. With relay 7P10 released, relay 8Z operates removing the ground from conductor 813 and permitting steering relay 8DB to operate in series with the winding of relay 8D5.

It will be remembered that the attendant at the master station selected the digits two and three for transmission to the remote stations and this caused the operation of tens and units selection relays 3T2 and 3U3. Having registered the pulses representing the digits two and three which were reflected back as a result of the transmission of the verification signals, the master station is now ready to transmit an execute signal. In this illustrative example the digit three will be used as an execute signal. With digit counting relay 8D5 operated a circuit is completed for operating the pulse start relay 6PS. This circuit can be traced from ground through operated contacts of relays 3ST and 8W, operated contacts of relays 3T2 and 5RT2, operated contacts of relays 5RU3 and 3U3, operated contacts of relays 8D5 and 7P0, normal contacts of relay 7P1 and through the winding of relay 6PS to battery.

When pulse start relay 6PS is operated pulsing relay 7P is once again connected to the pulse generator in FIG. 7, and relay 7P begins to alternately connect battery and ground over M lead 114 to single frequency signaling circuit 110. In addition the pulse counting circuitry is beginning its tenth cycle with relay 7P0 operated. The pulsing relay 7P will send out the pulses via the single frequency signaling circuit until the counting circuit in FIG. 7 detects the third pulse and relay 7P3 operates. Relay 7P3, when operated, extends the operating ground for relay 7PS over conductor 602 and through the winding of pulse end relay 6PE to battery operating relay 6PE which opens the holding circuit for relay 6PS. Relay 6PS releases disconnecting pulsing relay 7P from pulse generator relay 7PG.

The three pulses transmitted for the execute signal function in the same manner as previously described each operating and releasing pulse receiving relay 9RE at the remote station. Relay 9RE, in following the pulses, also causes the counting circuit (relays 11R-) in FIG. 11 to function. Assuming that all three pulses of the execute signal have been transmitted, counting relay 11R3 and steering relay 11SC will be operated. At the end of the execute signal pulse train, relay 9RE is held operated by single frequency signaling circuit 111, and slow release relay 11RA is permitted to release. A circuit is now completed for operating relay 10TR in FIG. 10. This circuit can be traced from ground through operated contacts of relay 11R over conductor 1001, through normal contacts of relay 11RA, operated contacts of relay 10DA, over conductor 1007, operated contacts of relays 10DB and 10DD, over conductor 1010, operated contacts of relay 11R3 and through the winding of relay 10TR to battery.

When relay 10TR operates signifying the receipt of the execute signal a circuit is completed for operating one of the control relays in communications circuit 102. Since the selected command signal was digit 3, relay 10U3 was priorly operated, and an obvious circuit is now completed for operating control relay 9CR. Had other command signals been transmitted to the remote station 101, a different units relay (10U-) would be operated to operate a different control relay in communications circuit 102.

Meanwhile, at the master station 100 the pulse generator and counting circuitry in FIG. 7 is going through its eleventh cycle during which no pulses are transmitted to the remote stations, but sufficient time is allowed for control relay 9CR at remote station 101 to perform its function in communications circuit 102. Near the end of the eleventh cycle pulse counting relay 7P10 is once again operated to reoperate relay 8W, and relay 8W extends ground over conductor 804, through normal contacts of relays 8Z and 8DC, operated contacts of relay 8DB, over conductors 810 and 814, operated contacts of relay 8D5 over conductor 815 and through the winding of relay 8D6 to operate digit counting relay 8D6.

Relay 8D6 in operating connects ground through operated contacts of relay 3ST and over M lead 114 to single frequency signaling circuit 110 thereby causing tone to be transmitted to the single frequency signaling circuit 111 at the remote station. Transmission of tone to the remote station causes receive relay 9RE thereat to release and after a sufficient interval of time slow release relay 11R in FIG. 11 releases. Relay 11R, in releasing, restores all of the relays at the remote station to normal.

The pulse generator and counting circuit at the master station now goes through its twelfth and final cycle but no pulses will be transmitted to the remote stations. Near the end of the final cycle relay 7P10 operates once more to operate relay 8W. With relay 8W and digit counting relay 8D6 operated, a circuit is completed for operating release relay 8RLS. This circuit can be traced from ground through operated contacts of relays 3ST and 8W, over conductor 804, normal contacts of relay 8Z, operated contacts of relay 8DC, over conductor 811, operated contacts of relay 8D6, over conductor 816 and through the winding of relay 8RLS to battery. Relay 8RLS in operating locks to ground on conductor 817 through operated contacts of relay 3ST.

Relay 8RLS opens one set of its contacts in FIG. 3 to interrupt the holding circuit for relays 3ST, 3TA and 3T2 and these relays release. Relay 8RLS also opens its other contacts in FIG. 3 to release relays 3U3 and 3UA. In releasing, relay 3ST opens its contacts in FIG. 7 stopping the pulse generator, releasing the last operated counting relay (7P-) and the last operated steering relay (7PA, 7PB or 7PC). In addition, relay 3ST opens its contacts in FIG. 5 to release relays 5RT2, 5RTB, 5RU3 and 5RUC, and relay 3ST opens its contacts in FIG. 8 to release relays 8D6, 8DC, 8Z and 8RLS thereby restoring the master station to normal.

Thus, from the foregoing description it can be seen that any one of a plurality of remote stations can be addressed and command signals sent to the remote station and that verification of the signals received at the remote station can be accomplished by transmitting additional signals from the master station and reflecting the signals back to the master station modified in accordance with the signals initially registered at the remote station.

In other words, the master station is capable of transmitting a plurality of signals which in the illustrative embodiment are ten pulses. Each distinct address code or command signal is composed of a different number of pulses. In the foregoing description the address code used comprised two pulses while the command signal comprised a pulse train of three pulses. When a particular function was to be performed at the designated remote station, the address code 2 and the command signal 3 were transmitted to the remote station and registered thereat.

To ascertain if the digits were correctly registered at the remote station, the entire group of signals (i.e., all ten pulses) are transmitted to the remote station, but only the pulses representing the digits stored at the remote station are reflected back. More specifically, to verify that the address code, digit 2, has been received at the remote station, a ten-pulse verification signal was transmitted to the remote station and only the first two pulses were reflected back to the master station. Similarly, to verify the registration at the remote station of a command signal comprising the digit 3, a ten-pulse verification signal was transmitted from the master station, and only the first three pulses were reflected back to the master station. The reflecting signals are registered at the master station and matched with the address and command signals initially selected. If a suitable match is detected, an execute signal is sent to the remote station.

Although the mode of signaling used in this illustrative embodiment of the invention involves direct-current pulses which are converted to tone bursts for transmission between the master station and the remote stations, it will be obvious to those skilled in the art that other types of signaling are suitably adapted for use in my invention.

Remote station reporting

As was set forth in the general description, the system is arranged to report to the master station various conditions that might obtain at a remote station. For example, if a trouble condition is encountered at one of the remote stations, the remote station experiencing the trouble signals the master station and the master station takes a roll call to ascertain which remote station is in trouble.

To illustrate the operation of the system in reporting various conditions at a remote station, let it be assumed that a trouble condition in communications circuit 102 is indicated by the operation of an alarm relay 9AL2, the contacts of which are shown in FIG. 9. Relay 9AL2, in operating, extends ground over conductor 901 to operate relay 9A at remote station 101.

Relay 9A operates and completes a circuit for operating relay 9TX. This circuit can be traced from ground through normal contacts of relays 11R and 10AX, operated contacts of relay 9A, over conductor 903 and through the winding of relay 9TX to battery. Relay 9TX connects negative battery from resistance R7, over conductor 902, through operated contacts of the 9TX and over M lead 117 to single frequency signaling circuit 111 to remove the tone being transmitted to single frequency signaling circuit 110 at the master station.

Turning now to the master station in FIGS. 3–8, when tone is removed from line 113 receive relay 6ME operates, and relay 6ME extends ground from normal contacts of relay 3ST in FIG. 3, over conductor 319 and through the winding of relay 3T1, thereby operating relay 3T1. Relay 3T1 completes an obvious operating circuit in FIG. 3 for operating relay 3STA.

Relay 3STA, in operating, completes a circuit for operating relays 3UA and 3U1 in series. This circuit can be traced from ground through normal contacts of relays 8RLS over conductor 311, through the winding of relay 3UA, over conductor 312, operated contacts of relay 3STA and through the winding of relay 3U1 to battery. When relay 3UA operates ground from normal contacts of relay 8RLS in FIG. 3 is extended over conductor 304, through the contacts of relay 3UA and through the winding of start relay 3ST to battery operating relay 3ST. With relay 3STA operated the "ALL OK" lamp 408 is extinguished. In addition, relays 3T1 and 3U1 light lamps 4T1 and 4U1, respectively, to provide an indication that the alarm reporting cycle is in progress.

It will be recalled from the prior description that when the start relay 3ST operated the pulse generator and counting circuitry in FIG. 7 began to operate through its first cycle. The operation of relay 3ST at the master station also connects battery over M lead 114 removing tone from channel 112 and operating relay 9RE at each of the remote stations. Relay 9RE, in operating, opens the operating circuit for relay 9TX which releases, and relay 9TX, in releasing, removes battery from M lead 117 causing relay 6ME at the master station to release.

Meanwhile the pulse generator and counting circuit in FIG. 7 has stepped through its first cycle operating relay 8W at the end of that cycle. Relay 8W in operating completes the previously traced circuit for operating the first digit counting relay 8D1, and with relays 8W and 8D1 operated a circuit is completed in FIG. 4 for operating relay 4AA. This circuit can be traced from ground through operated contacts of relays 3STA, 8W, 8D1 and through the winding of relay 4AA to battery. Relay 4AA locks through its own contacts and operated contacts of relay 6ME to ground through the operated contacts of relay 3STA. Relay 4AA, in operating, opens its contacts in FIG. 4 to interrupt the locking circuit for normally operated relays 4A2 through 4A9, releasing any of these relays that have been operated as a result of a previous alarm reporting cycle.

The pulse generator and counting circuitry in FIG. 7 now begins its second cycle during which the digit 1 will be transmitted to all remote stations. The outpulsing of the digit 1 is accomplished in the same manner as previously described with respect to the outpulsing of the address code and command signals. Pulse start relay 6PS is operated when pulse count relay 7P0 operates during the second cycle. Relay 6PS connects pulsing relay 7P to the pulse generator relay 7PG, and relay 7P, it will be remembered, transmits pulses via the single frequency signaling circuits to the remote stations.

In addition, with relay 3STA operated relay 7P completes a path for operating tens register relay 5RT1. This circuit can be traced from ground through operated contacts of relays 3ST, 3STA and 7P, over conductor 505, operated contacts of relay 8D1, over conductor 500, normal contacts of relays 5RTC, 5RTB and 5RTA, over conductor 501 and through the winding of relay 5RT1 to battery. When relay 5RT1 operates, a circuit is completed to extend the operating ground to the winding of steering relay 5RTA which does not operate at this time since it has ground on both sides of its winding. Relay 5RTA does operate, however, at the end of the first pulse. At the end of the first pulse counting relay 7P1 operates and completes a circuit for operating pulse end relay 6PE. This circuit can be traced from ground through operated contacts of relays 3ST and 8W, over conductor 603, through operated contacts of relays 7P1, 3T1 and 8D1, over conductor 602 and through the winding of relay 6PE to battery. Relay 6PE operates to release pulse start relay 6PS and disconnect pulsing relay 7P from the pulse generator thereby blocking the further transmission of pulses to the remote stations.

At the remote station relay 9RE responds to the receipt of the first pulse actuating counting relay 11R1.

After the first digit 1 is transmitted to the remote stations the pulse generator and counting circuit at the master station (FIG. 7) steps through its third cycle to provide the first interdigital timing interval. During this interval relay 9RE at the remote station is held operated to release relay 11RA thereat.

With relay 11RA released and counting relay 11R1 operated a circuit is completed from ground through operated contacts of relay 11R in FIG. 10, over conductor 1001, normal contacts of relays 11RA and 10DA, operated contacts of relay 11R1, over conductor 1011, normal contacts of relay 10AL and through the winding of relay 10AL to battery thereby operating relay 10AL. Relay 10AL locks through its own contacts to ground on conductors 1013 and 1004. Additionally, the ground on conductor 1011 is extended over conductor 1012, normal contacts of relay 9AR and through the winding of relay 10AX to battery operating relay 10AX. Relay 10AX locks through its own contacts to ground on operated contacts of relay 9A. Relays similar to 10AL at all other remote stations operate in a similar manner to prepare all stations for reporting when they are poled from the master station.

At the master station the pulse generator and counting circuit in FIG. 7 is continuously operating and near the end of the third cycle when relay 7P10 operates, relay 8W operates to complete the previously traced operating circuit for digit counting relay 8D2 which operates. Subsequently, when relay 7P10 releases the shunt is removed from around relay 8Z allowing it to operate and remove the shunt from around steering relay 8DB, and relay 8DB operates. With relay 8DB operated, an additional operating path is provided for relays 8W and 8Z when relay 7P8 operates during each subsequent counting cycle. By operating and releasing relays 8W and 8Z once during each counting cycle, the digit 1 is outpulsed at the start of each cycle and the interdigital timing interval is reduced. Relays 8D2 and 8DB remain operated so that subsequent pulses will advance units register relays 5RU-.

The pulse generator and counting circuit now steps to its fourth cycle transmitting another digit 1 to the remove stations. This is accomplished in the same manner as previously described, however when pulsing relay 7P operates to transmit the digit 1 it also operates units registration relay 5RU1 in FIG. 5. This circuit can be traced from ground through operated contacts of relays 3ST, 3STA, 7P and 8D2, through normal contacts of relays 5RUC, 5RUB and 5RUA, over conductor 504 and through the winding of relay 5RU1 to battery. At the end of the first pulse the ground is removed from conductor 504, and relay 5RUA operates in series with the winding of relay 5RU1. At the end of the first pulse, counting relay 7P1 operates completing the previously traced path for operating pulse end relay 6PE, and relay 6PE operates releasing pulse start relay 6PS. Pulse start relay 6PS, in releasing, disconnects pulsing relay 7P from the pulse generator circuit and stops the further transmission of pulses to the remote stations.

At the remote station 101 relay 11RC does not operate to recycle the register circuit in FIG. 11 and when relay 9RE responds to the second digit 1 operating counting relay 11R2 and steering relay 11SB which releases the priorly operated counting relay 11R1. During the interdigital timing interval after the second digit 1 has been received relay 9RE holds operated permitting relay 11RA to release, and a circuit is completed from ground through operated contacts of relay 11R in FIG. 10, over conductor 1001, normal contacts of relays 11RA and 10DA, over conductor 1014, operated contacts of relay 10AL, normal contacts of relay 11RA and operated contacts of relay 11R2 to punching RA2, over cross-connection 1015 to punching RT and over conductor 1016 to the contacts of relay 9A in FIG. 9. Since it has been assumed that an alarm condition exists at remote station 101, relay 9A would be operated to prevent the operation of relay 9TX. If no alarm conditions exist at the remote station, relay 9A would be released and relay 9TX would operate to signal the master station over the single frequency signaling circuits 111 and 110.

Each of the other remote stations would have its RT punching cross-connected to different RA– punching so that these stations would respond to the roll call in sequence as subsequent digits 1 are outpulsed from the master station. For example, as the third digit 1 is outpulsed, the counting relay 11R3 would be operated at all remote stations to extend the ground over the previously traced circuit to punching RA3. At station number 3 punching RA3 would be cross-connected to punching RT to extend the ground to the contacts of relay 9A thereat. If that station has an alarm condition, relay 9A would be operated to block the operation of relay 9TX, but if that station is not experiencing an alarm, relay 9TX operates connecting battery over M lead 117 to the single frequency signaling circuit 111. Battery on M lead 117 at a remote station, it will be remembered, causes relay 6ME at the master station to operate.

Since there is an alarm condition at remote station 101, relay 6ME does not operate when remote station 101 is polled. As a result, relay 4A2 in FIG. 4 does not operate, and a circuit is prepared for lighting lamp 405 to indicate that an alarm condition exists at remote station 101.

It will be remembered that the first digit 1 from the master station prepared all remote stations for alarm reporting and also operated tens register relay 5RT1. The second digit 1 on the other hand was used to poll the remote station 101 (whose address code is 2) and caused units register relay 5RU1 to operate at the master station. With the polling of each subsequent remote station by the transmission of additional digits 1 the units register circuit in FIG. 5 will advance accordingly.

For example, let it be assumed that the third digit 1 has been transmitted to a remote station whose address code is 3 and that no alarm conditions exist at that remote station. Accordingly, the RA3 punching at that station would be cross-connected to punching RT and relay 9TX at the polled station would operate to place battery on M lead 117 thereat. This causes relay 6ME at the master station to operate.

When the master station transmits the third digit 1, units register relay 5RU2 was operated, and with relay 6ME operated a circuit is completed for operating relay 4A3. This circuit can be traced from ground through operated contacts of relay 3STA, normal contacts of relay 8W, operated contacts of relay 6ME over conductor 404, operated contacts of relay 5RU2, normal contacts of relay 4A3 and through the winding of relay 4A3 to battery. Relay 4A3 locks through its own contacts to ground on normal contacts of relay 4AA. Relay 4A3 in operating also prepares a circuit for lighting the no-alarm lamp 406 for station number 3.

The master station continues to transmit a series of digits 1 until all of the remote units have been polled and have answered back with a no-alarm or alarm condition as indicated by the operation or release of relay 6ME at the master station. After the last or tenth station has been polled, units register relay 5RU0 operates from the operated pulsing relay 7P and closes a circuit for operating relay 8D6. This circuit can be traced from ground through operated contacts of relays 3ST and 8W, normal contacts of relays 8Z and 8DC, operated contacts of relay 8DB, over conductor 810, through normal contacts of relay 3STC, operated contacts of relay 3STA, over conductors 818 and 815 and through the winding of relay 8D6 to battery. The digit counting relay 8D6 connects ground to M lead 114 by-passing the contacts of pulsing relay 7P. Steady ground on M lead 114 causes relay 9RE to release at the remote stations, and relay 9RE releases relay 11R causing the remote station to restore to normal except that relays 9A and 10AX will remain operated at those stations having an alarm condition which is indicated by the operated relay 9AL– thereat.

With relay 8D6 operated the next counting cycle by the pulse generator and counting circuit (FIG. 7) causes relay 8W to operate and complete the previously traced circuit for operating release relay 8RLS. Relay 8RLS, in operating, opens a holding circuit for relays 3ST, 3T1, 3TA, 3U1 and 3UA and these relays release. Relay 3ST, in turn, releases relay 3STA.

At the end of the polling cycle if no remote stations have reported an alarm condition, relays 4A2 through 4A9 would be operated, and relay 4MA remains released lighting "ALL OK" lamp 408. If, however, as with the example being described at least one station has reported an alarm, the corresponding relay 4A– would be released completing an obvious circuit for operating relay 4MA. With relay 4MA operated battery is extended over conductor 407 to light the various lamps indicating which remote stations have alarm conditions. Since remote station 101 reported an alarm, lamp 405 would be lighted.

Checking alarm conditions at remote station

It will be recalled from the above description that each remote station may encounter several trouble conditions which can actuate different alarm relays (9AL–) at the remote stations. In the remote station reporting cycle described above the master station took a roll call of all remote stations to see which station had encountered an alarm. Having determined which station was reporting an alarm by the lamp indication at the attendant's console, the attendant can now interrogate that station to ascertain which of the many alarms may be operated at that station.

It has been assumed that the alarm relay 9AL2 was operated at remote station 101 causing the alarm lamp 405 at the master station to be lighted at the end of the roll call of all remote stations. The attendant at the master station now operates selection keys 2 and 1 to initiate the alarm checking operation The selection key 2 causes the transmissions of the address code for the remote station 101, and selection key 1 causes the transmission of the digit 1 which is the command signal to initiate the alarm checking cycle.

The momentary operation of selection key 2 causes relays 3T2 and 3TA to operate as before followed by the momentary operation of selection key 1 which causes relays 3U1, 3UA and 3ST to operate in the same manner as previously described with respect to the addressing of a remote station. With relay 3U1 operated an obvious circuit for operating relay 3STC is completed in FIG. 3.

Relay 3ST, in operating, starts the pulse generator and counting circuit in FIG. 7, and the digit 2 is transmitted to all remote stations to operate relays 10TA and 10DA at the addressed station, that is, remote station 101, and to operate relay 10C0 at all other remote stations.

The operation of the other selection key 1 causes the command digit 1 to be transmitted to the remote station 101, and upon the receipt of the digit 1 pulse counting relay 11R1 is operated at the remote station to complete a circuit for operating checking relay 10CK. This circuit can be traced from ground through operated contacts of relay 11R, over conductor 1001, normal contacts of relay 11RA, operated contacts of relay 10DA, over conductor 1007, normal contacts of relays 10DB and 10CK, operated contacts of relay 11R1 over conductor 1018, normal contacts of relay 10CK and through the winding of relay 10CK to battery. Relay 10CK locks through its own contacts to ground on conductors 1017 and 1004.

Relay 10CK, in operating, extends its operating ground from conductor 1007 through its operated contacts, over conductor 1019 to FIG. 9, over conductor 907, operated contacts of relay 11R1 and through the winding of relay 9TX to battery operating relay 9TX. Relay 9TX in operating extends battery over M lead 117 to single frequency signaling circuit 111 causing the tone to be removed from line 113 and relay 6ME at the master station to operate.

At the master station with relay 3STC operated the digit 2 is also registered on the tens digit register (relays 5RT1 through 5RT0) as indicated by the operated relay 5RT2.

With relay 3STC operated the master station performs substantially the same as during the alarm reporting cycle, that is, by automatically transmitting a series of alarm checking digits (digits 1) to the addressed remote station and responding to an answer-back signal as indicated by the operated or released condition of relay 6ME at the master station.

The digit 1 transmitted after the address and command signals (2 and 1) causes the counting relay 11R2 and relay 11SB at the remote station to operate releasing relay 11R1. During the interdigital timing interval at the end of the first checking digit 1 relay 11RA releases at the remote station and a circuit is completed from ground through operated contacts of relay 11R, over conductor 1001, normal contacts of relay 11RA, operated contacts of relay 10DA, over conductor 1007, through normal contacts of relay 10DB, operated contacts of relay 10CK, over conductor 1019 to FIG. 9, over conductor 906, normal contacts of relay 11RA, over conductor 904 and through operated contacts of relay 11R2 to the contacts of relay 9AL1. Since it has been assumed that relay 9AL1 has not operated, the ground is extended over conductor 905 and through the winding of relay 9TX to battery, operating relay 9TX. Relay 9TX, in operating, connects battery to M lead 117 at the remote station causing relay 6ME at the master station to operate. If the 9AL1 relay were operated due to a particular alarm condition at the remote station, relay 9TX would not operate at this time to return a signal to the master station. It has been assumed, however, that the only alarm relay at the remote station which is operated is relay 9AL2 and therefore relay 9TX operates at this time.

The master station responds in the same manner as during the alarm reporting cycle previously described. Each time an alarm checking digit 1 is transmitted to the remote station the digit also advances the units register circuit in FIG. 5. With the first alarm checking digit 1 relay 5RU1 is operated lighting lamp 4U1, the second digit 1 operates relays 5RU2 and 5RUB, lighting lamp 4U2 and extinguishing lamp 4U1, etc., as each checking digit 1 is outpulsed to the remote station.

The master station continues to transmit alarm checking digits as long as a satisfactory answer-back signal is received from the remote station as indicated by the operation of relay 6ME at the master station.

When the master station transmits the eighth digit 1, relay 11R8 is operated at the remote station 101 and a check is made of the contacts of alarm relay 9AL2 in communications circuit 102. Since it has been assumed that relay 9AL2 is operated indicating a particular alarm at remote station 101, the contacts of relay 9AL2 interrupt the operating circuit for relay 9TX. Relay 9TX, by not operating at this time, does not send back the satisfactory answer-back signal to the master station to operate relay 6ME thereat.

With relay 6ME normal when relay 8W releases after the eighth alarm checking digit 1 is transmitted, a circuit is completed for stopping the pulse generator relay 7PG and holding that relay operated. This circuit can be traced from ground through operated contacts of relay 3STC, normal contacts of relay 6ME, operated contacts of relay 8D2, normal contacts of relay 8W, over conductors 709 and 702, through the upper winding of relay 7PG and through resistances R1 and R2 to battery holding relay 7PG operated.

Having already transmitted the eighth digit 1, register relay 5RU8 would be operated to light lamp 4U8 (not shown) and inform the attendant which alarm condition exists at the remote station 101.

The master station will stay locked in this condition until the attendant momentarily operates control key 307 which momentarily closes the operating circuit for relay 3C. Relay 3C in operating completes a circuit in FIG. 6 from ground through operated contacts of relay 3STC to operate relay 6ME and simulate a satisfactory answer-back from the remote station.

When relay 6ME operates, the holding path for relay 7PG is removed and the pulse generator relay starts once again. Additional alarm checking digits 1 are transmitted until all the alarm relay contacts at the remote station 101 have been checked. For digits not connected through a checking path in an associated circuit, a simulated path is provided in FIG. 9 so that relay 9TX will operate and cause the circuit to advance in a normal manner. The circuit then releases substantially in the same manner as previously described with respect to the alarm reporting cycle.

It is to be understood that the above-described arrangements are merely illustrative of the application of the principles of the invention. Numerous other arrangements may be devised by those skilled in the art without departing from the spirit and scope of the invention.

What is claimed is:

1. In a remote control system, a master station including means for generating a plurality of control signals, a remote station, means at said master station for selecting from said plurality a particular control signal to be transmitted to said remote station, means for registering said selected control signal at said remote station, means for transmitting all of said control signals to said remote station, and means controlled by said register means for returning back to said master station certain of said control signals generated and transmitted by said master station.

2. In a remote control system, a master station including means for generating a plurality of control signals, a remote station, means at said master station for selecting a particular one of said control signals and transmitting said selected control signal to said remote station, means at said remote station for registering said selected control signal, means at said master station effective subsequent to the transmission of said selected control signal for transmitting all of said control signals to said remote station, means at said remote station controlled by said register means for returning back to said master station certain of said subsequently transmitted control signals generated and transmitted by said master station and means at said master station for comparing the selected and returned control signals.

3. In a remote control system, a master station including signal generating means, a remote station, means at said master station for transmitting a command signal to said remote station, means at said remote station for registering said command signal in preparation for performing a control function thereat, means at said master station for transmitting a verification signal to said remote station, means at said remote station controlled by said register means for altering said verification signal in accordance with the command signal priorly registered thereat and for returning said altered verification signal generated at said master station back to said master station, means at said master station for matching said command signal with said returned verification signal, and means responsive to said matching means for transmitting an execute signal to said remote station.

4. In combination, a master station including means for generating a plurality of command signals; a remote station; a signaling channel interconnecting said master station with said remote station; means at said master station for transmitting a selected one of a plurality of command signals over said channel to said remote station; means at said remote station for registering said selected command signal; and an arrangement for verifying the registration of command signals at said remote station comprising means for transmitting all of said command signals over said channel to said remote station, means at said remote station controlled by said register means for returning back over said channel to said master station the particular command signal received from said master station which corresponds to the command signal priorly registered at said remote station, and means at said master station for comparing the selected and returned command signals.

5. In combination a master station including means for generating a plurality of signals; a remote station; a first signaling channel interconnecting said stations, means at said master station for transmitting over said first channel to said remote station a selected one of said signals; means at said remote station for registering the signal received over said first channel; and an arrangement for verifying the signals registered at said remote station comprising means for transmitting all of said signals over said first channel to said remote station, a second signaling channel interconnecting said stations, means at said remote station for returning back over said second channel to said master station a particular one of said signals received from said master station over said first channel and corresponding to said signal registered at said remote station, and means at said master station for comparing said returned signal with said selected signal.

6. In combination a master station including means for generating a plurality of signals; a remote station; a first signaling channel interconnnecting said stations; means at said master station for selecting one of said signals and transmitting said selected signal over said first channel to said remote station; a control circuit at said remote station; means at said remote station for registering signals received over said first channel in preparation for actuating said control circuit in accordance with the particular signal registered thereat; and an arrangement for verifying signals registered at said remote station comprising means for transmitting all of said signals over said first channel to said remote station, a second signaling channel interconnecting said stations, means at said remote station for returning back over said second channel to said master station a particular one of said signals received from said master station over said first channel and corresponding to signals registered at said remote station, means at said master station for matching said select signal with said returned signal, and means responsive to said matching means for transmitting an execute signal to actuate said remote station control circuit.

7. The invention defined in claim 6 wherein said returning means comprises means comprises means for coupling said first and second signaling channels so that signals received at said remote station over said first channel are retransmitted back to said master station over said second channel, and wherein said register means comprises means for blocking the retransmission of all signals different from said registered signal.

8. A signaling system comprising a master station including means for generating a plurality of pulse groups each comprising a different number of pulses; a remote station; a first signaling channel interconnecting said stations; means at said master station for transmitting a first one of said pulse groups over said first channel to said remote station; control means at said remote station; means at said remote station for registering the number of pulses in said first pulse group; and an arrangement for ascertaining the number of pulses registered at said remote station comprising means for transmitting over said first channel to said remote station a second pulse group having a greater number of pulses than said first pulse group, a second signaling channel interconnecting said stations, means at said remote station for repeating back over said second channel to said master station a portion of said second pulse group which represents the number of pulses registered at said remote station, means at said master station for counting the number of pulses in said second group repeated over said second channel and for comparing the number of counted pulses with said first pulse group, and means responsive to said comparing means for transmitting a third pulse group over said first channel to said remote station for actuating said control means.

9. The invention defined in claim 8 wherein said first signaling channel comprises signal transmitting circuitry at said master station and signal receiving circuitry at said remote station, wherein said second signaling channel comprises signal transmitting circuitry at said remote station and signal receiving circuitry at said master station, and wherein said remote station repeating means comprises means for coupling said first channel receiving circuitry with said second channel transmitting circuitry under control of said register means.

10. In a remote control system, a master station including signal generating means, a remote station, means at said master station for transmitting a plurality of first signals to said remote station, means at said remote station for registering each of said first signals in preparation for performing a control function thereat, means at said master station effective after the transmission of said first signals for sequentially transmitting a plurality of second signals to said remote station, means at said remote station for altering a different one of said second signals in accordance with each first signal registered thereat and for returning said altered second signals back to said master station, means at said master station for comparing each of said first signals with one of said altered second signals, and means effective when said altered signals correspond to said first signals for transmitting a third signal to said remote station to perform a control function in accordance with the first signals registered thereat.

11. In a remote control system a master station; a plurality of remote stations each including gating means responsive to a different address signal; means at said master station for transmitting a particular address signal to all said remote stations for enabling the gating means at a particular one of said remote stations; means at said master station for transmitting a selected command signal to said remote stations; means at said particular remote station effective when said gating means is enabled for registering said selected command signal; and an arrangement for verifying signals registered at said particular remote station comprising means at said master station for transmitting a first verification signal to said remote stations, means at said particular remote station for altering said first verification signal to correspond to said particular address signal and for returning said altered first verification signal to said master station, means at said master station for transmitting a second verification signal to said remote stations, means at said particular remote station for altering said second verification signal to correspond to the command signal registered thereat and for returning said altered second verification signal to said master station, means at said master station effective when said first altered verification signal matches said particular address signal and said second altered verification signal matches said selected command signal for transmitting an execute signal to said remote stations, and means at said particular remote station responsive to said execute signal for performing a control function in accordance with the command signal registered thereat.

12. The invention defined in claim 11 wherein said gating means at said particular remote station comprises means responsive to signals other than said particular address signals for blocking the operation of said register means.

13. In a signaling system comprising first and second stations wherein any one of a plurality of signals is registered at said second station, an arrangement for ascertaining the particular signal registered at said second station comprising means at said first station for transmitting all said singals to said second station and means at said second station for returning back to said first station only that signal received from said first station which corresponds to the signal registered at said second station.

14. A method for verifying at a first station the receipt of signals at a second station comprising the following steps, transmitting a particular signal to the second station and registering the signal thereat, transmitting from the first station to the second station a predetermined plurality of signals including the particular signal and returning back to the first station a portion of said plurality of signals transmitted from the first station, wherein the returned portion of signals is determined by the particular signal registered at the remote station.

15. A method for verifying at a master station the receipt of signals at a remote station comprising the following steps, transmitting a first signal from the master station to the remote station, registering the first signal at the remote station, transmitting from the master station to the remote station a second signal, altering the second signal at the remote station in accordance with the first signal registered thereat and returning the altered second signal back to the master station, and comparing at the master station the first signal transmitted with the returned altered signal.

References Cited

UNITED STATES PATENTS

| | | | |
|---|---|---|---|
| 3,119,981 | 1/1964 | Breese | 340—163 |
| 3,336,444 | 8/1967 | Piechocki | 340—168 XR |
| 3,374,309 | 3/1968 | Elich et al. | 178—3 XR |
| 2,746,028 | 5/1956 | Bachelet et al. | |
| 2,942,238 | 6/1960 | Eckhardt et al. | |

DONALD J. YUSKO, Primary Examiner

U.S. Cl. X.R.

178—3